(12) United States Patent
Tung et al.

(10) Patent No.: US 10,777,002 B2
(45) Date of Patent: *Sep. 15, 2020

(54) 3D MODEL GENERATING SYSTEM, 3D MODEL GENERATING METHOD, AND PROGRAM

(71) Applicant: Rakuten, Inc., Tokyo (JP)

(72) Inventors: Tony Tung, Tokyo (JP); Jiu Xu, Tokyo (JP); Bjorn Stenger, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,718

(22) Filed: Nov. 12, 2019

(65) Prior Publication Data

US 2020/0082617 A1 Mar. 12, 2020

Related U.S. Application Data

(63) Continuation of application No. 15/579,599, filed as application No. PCT/JP2016/065805 on May 27, 2016.

(51) Int. Cl.
| | |
|---|---|
| *G06T 17/05* | (2011.01) |
| *G06T 7/564* | (2017.01) |
| *G06T 7/55* | (2017.01) |
| *G01B 11/24* | (2006.01) |
| *G06T 17/00* | (2006.01) |
| *G06T 7/00* | (2017.01) |

(52) U.S. Cl.
CPC .............. *G06T 17/05* (2013.01); *G01B 11/24* (2013.01); *G06T 7/55* (2017.01); *G06T 7/564* (2017.01); *G06T 7/97* (2017.01); *G06T 17/00* (2013.01); *G06T 2200/08* (2013.01)

(58) Field of Classification Search
None
See application file for complete search history.

(56) References Cited

U.S. PATENT DOCUMENTS

| | | | |
|---|---|---|---|
| 2014/0301633 A1 | 10/2014 | Furukawa et al. | |
| 2018/0121571 A1* | 5/2018 | Tiwari | G06Q 10/10 |

OTHER PUBLICATIONS

EP Search Report dated Oct. 23, 2019, for corresponding EP Patent Application No. 16901164.0.
Yasutaka Furukawa et al: "Accurate Dense, and Robust Multiview Stereopsis", IEEE Transactions on Pattern Analysis and Machine Intelligence, IEEE Computer Society, USA, vol. 32, No. 8, Aug. 2010, pp. 1362-1376, XP011295489.

* cited by examiner

*Primary Examiner* — Jeffrey J Chow
(74) *Attorney, Agent, or Firm* — HEA Law PLLC

(57) ABSTRACT

A 3D model generating system for accurately estimating a shape of an entire space surrounded by a plurality of surfaces is provided. Image acquiring means of the 3D model generating system acquires a plurality of images respectively capturing different directions in a space surrounded by a plurality of surfaces. Partial model generating means generates a plurality of partial models respectively corresponding to the images, each of the partial models representing a portion of the surfaces captured in the images. Overall model generating means generates an overall model representing an entire surface based on the partial models generated by the partial model generating means.

13 Claims, 22 Drawing Sheets

FIG.13
| CATEGORY | OBJECT MODEL | ORIENTATION |
|---|---|---|
| BED | 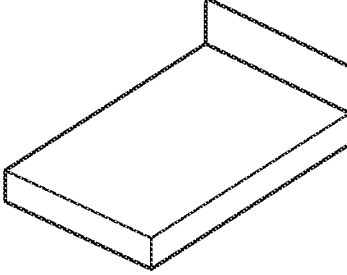 | YAW ANGLE 30°<br>PITCH ANGLE 0° |
| | 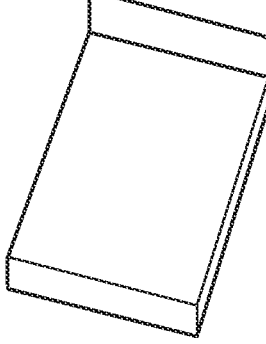 | YAW ANGLE 10°<br>PITCH ANGLE 0° |
| | ⋮ | ⋮ |
| CHAIR | 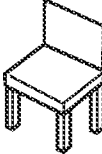 | YAW ANGLE 30°<br>PITCH ANGLE 0° |
| | ⋮ | ⋮ |

FIG.16
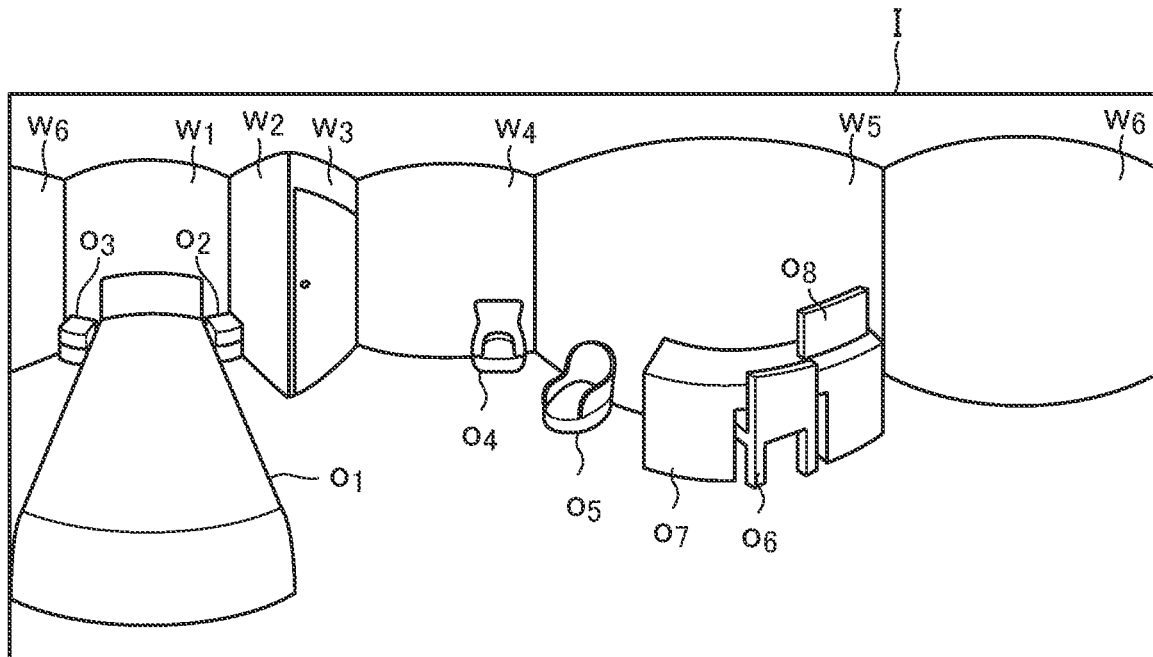
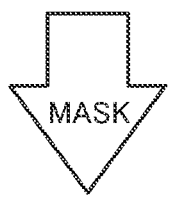
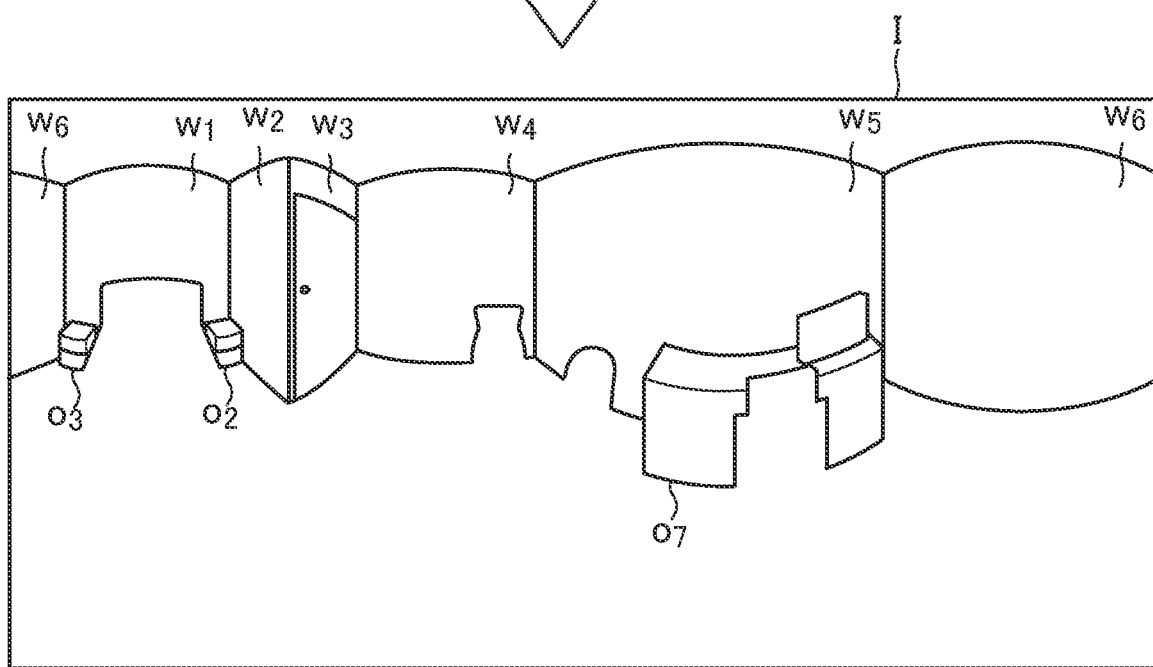

FIG.17
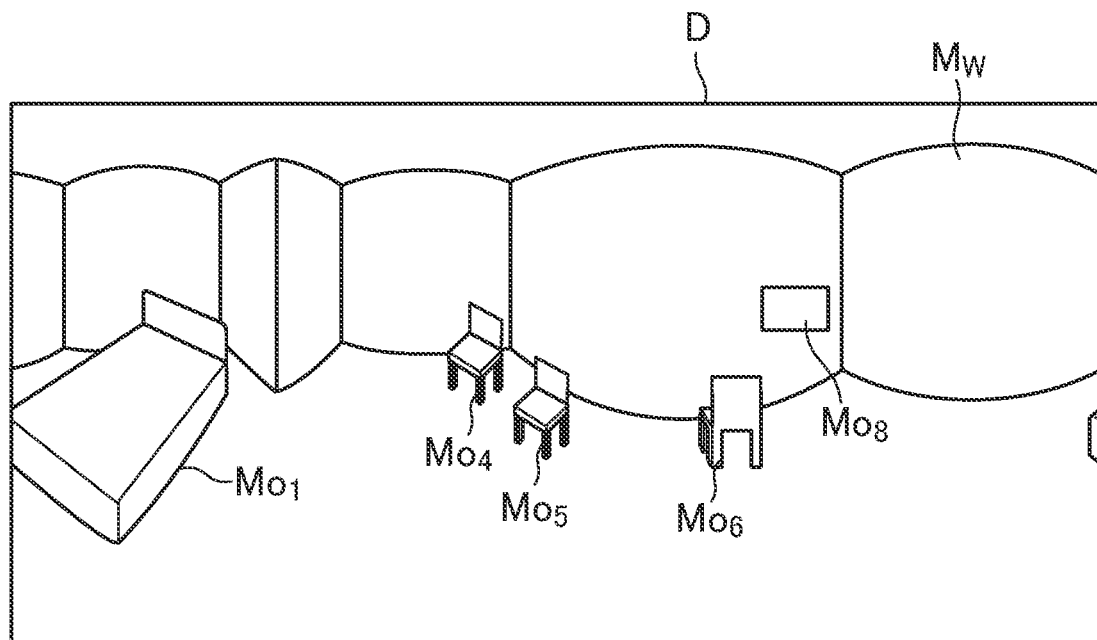
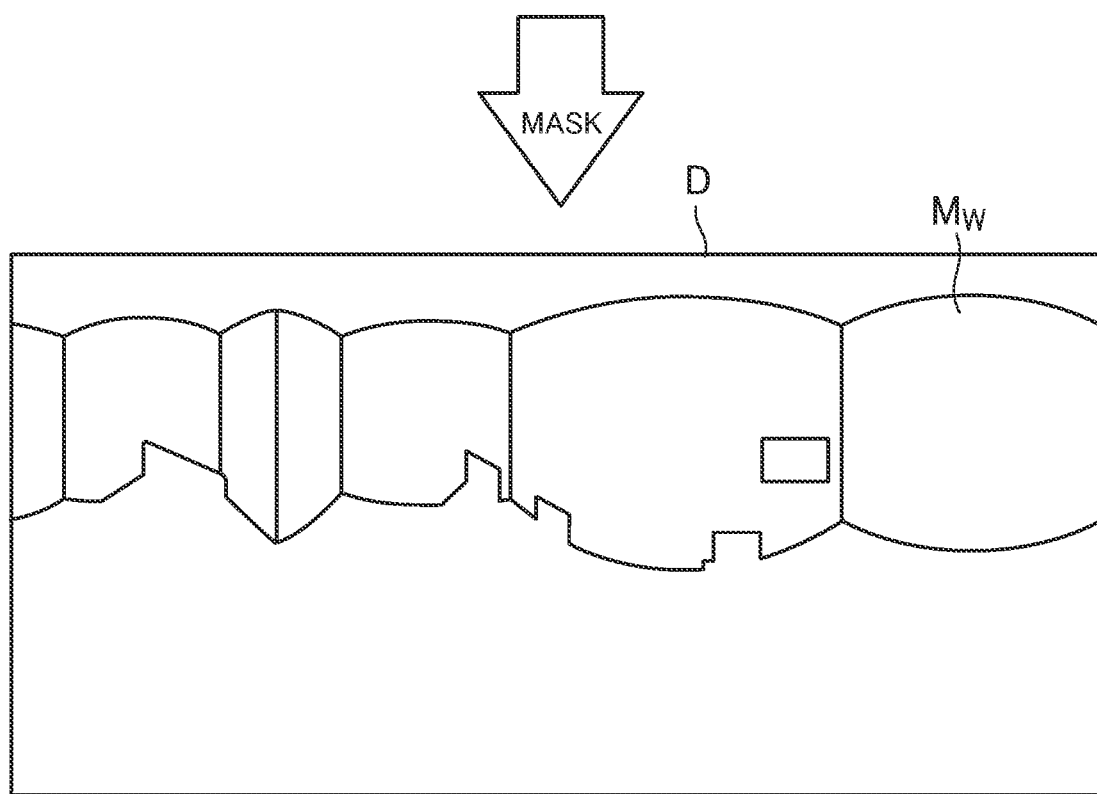

FIG.20
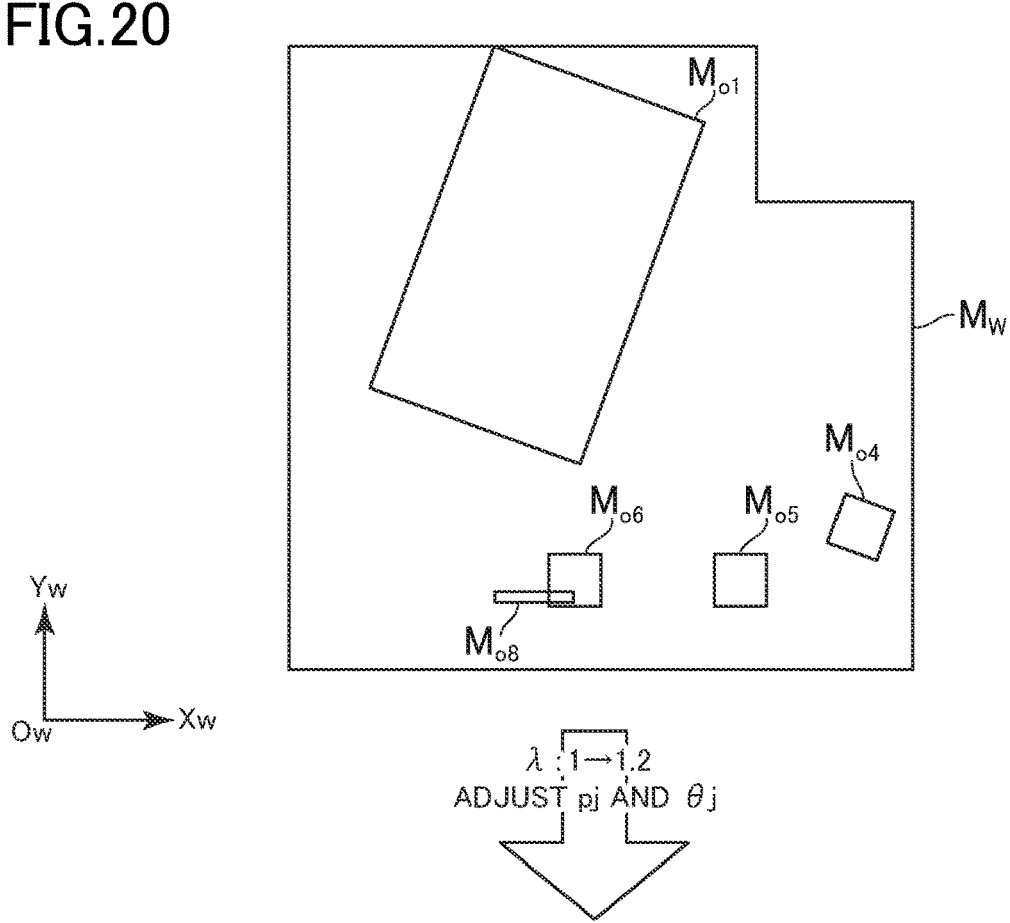
$\lambda : 1 \rightarrow 1.2$
ADJUST $p_j$ AND $\theta_j$
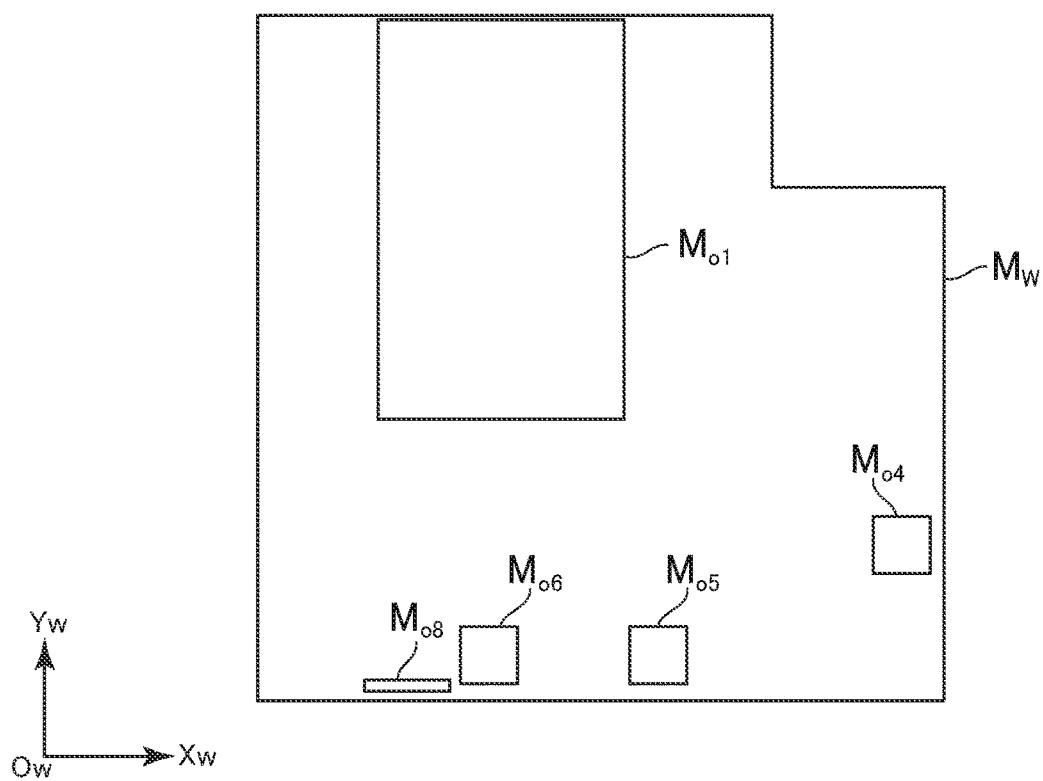

3D MODEL GENERATING SYSTEM, 3D MODEL GENERATING METHOD, AND PROGRAM

CROSS-REFERENCE TO RELATED APPLICATIONS

This application claims priority to and is a continuation of U.S. application Ser. No. 15/579,599 filed on Dec. 5, 2017, which is a National Stage of International Application No. PCT/JP2016/065805 filed on May 27, 2016. The contents of the above documents are incorporated herein by reference in its entirety.

TECHNICAL FIELD

The present invention relates to a 3D model generating system, a 3D model generating method, and a program.

BACKGROUND ART

There are known techniques for estimating a shape of space surrounded by multiple surfaces based on an image captured in the space. For example, Non-Patent Literature 1 describes techniques for generating a 3D model of a cuboid-shaped room based on a panorama image of the inside of the room captured by a camera with a fisheye lens capable of 360 horizontal degree shooting.

CITATION LIST

Non-Patent Document

Non-Patent Literature 1:
https://courses.cs.washington.edu/courses/cse590v/14au/cse590 v_wk3_panocontext.pdf

SUMMARY OF INVENTION

Technical Problem

In reality, however, a room has a pillar, for example, and a shape of a space to be estimated is usually not simple as a cuboid shape but complicated. In this regard, techniques of Non-Patent Literature 1 are only directed to generating a 3D model of a cuboid, and thus may not able to accurately estimate a shape of the target space.

One or more embodiments of the present invention have been conceived in view of the above, and an object thereof is to accurately estimate a shape of an entire space surrounded by surfaces.

Solution to Problem

In order to solve the above described problems, a 3D model generating system according to the present invention includes image acquiring means for acquiring a plurality of images respectively capturing different directions in a space surrounded by a plurality of surfaces, partial model generating means for generating a plurality of partial models respectively corresponding to the images, each of the partial models representing a portion of the surfaces captured in the images, and overall model generating means for generating an overall model representing an entire surface based on the partial models generated by the partial model generating means.

A 3D model generating method according to the present invention includes the steps of acquiring a plurality of images respectively capturing different directions in a space surrounded by a plurality of surfaces, generating a plurality of partial models respectively corresponding to the images, each of the partial models representing a portion of the surfaces captured in the images, and generating an overall model representing an entire surface based on the partial models generated in the step of generating the partial models.

A program according to the present invention causes a computer to function as image acquiring means for acquiring a plurality of images respectively capturing different directions in a space surrounded by a plurality of surfaces, partial model generating means for generating a plurality of partial models respectively corresponding to the images, each of the partial models representing a portion of the surfaces captured in the images, and overall model generating means for generating an overall model representing an entire surface based on the partial models generated by the partial model generating means.

An information storage medium according to the present invention is a computer-readable information storage medium that stores the program.

In an aspect of the present invention, a capturing range of each of the images partially overlaps a capturing range of at least one of other images. The partial model generating means generates the partial models, a surface of each partial model partially overlapping a surface of at least one of other partial models. The overall model generating means positions the overlapped portions of the partial models to generate the overall model.

In an aspect of the present invention, the overall model generating means acquires image information about capturing directions of the respective images, determines positions and orientations of the respective partial models, which respectively correspond to the images, based on the image information acquired for the respective images, and generates the overall model.

In an aspect of the present invention, the image acquiring means acquires the images based on a single image in which the space is captured. The image information indicates a position of each of the images in the single image. The overall model generating means determines positions and orientations of the respective partial models, which respectively correspond to the images, based on the positions of the respective images in the single image.

In an aspect of the present invention, the image acquiring means acquires the images based on an image capturing 360 degrees horizontally.

In an aspect of the present invention, the image acquiring means acquires the images respectively capturing different directions from a point in the space.

In an aspect of the present invention, the image acquiring means acquire the images captured in a room. The partial model generating means generates the partial models each representing a portion of the room. The overall model generating means generates overall model representing the entire room.

In an aspect of the present invention, the image acquiring means acquires the images respectively captured in a plurality of rooms on a same floor. The partial model generating means generates the partial models respectively corresponding to the rooms. The overall model generating means generates the overall model respectively corresponding to the rooms. The 3D model generating system further includes floor model generating means for generating an overall 3D model of the floor based on the overall model generated by the overall model generating means.

In an aspect of the present invention, the image acquiring means acquires the images of the rooms each having six or more side surfaces substantially orthogonal to one another. The partial model generating means generates the partial models each representing a portion of the six or more side surfaces. The overall model generating means generates the overall model each representing the entire six or more side surfaces.

Advantageous Effects of Invention

According to the present invention, it is possible to accurately estimate a shape of an entire space surrounded by multiple surfaces.

BRIEF DESCRIPTION OF DRAWINGS

FIG. 13 is a diagram illustrating an example of storing data in an object model database;

FIG. 16 is a diagram illustrating an orientation map of a photographed image with objects being masked;

FIG. 17 is a diagram illustrating an orientation map of a virtual image with object models being masked;

FIG. 20 is a diagram illustrating the virtual space when model parameters are adjusted;

DESCRIPTION OF EMBODIMENTS

1. Embodiment 1

An example of an embodiment of the 3D model generating system of the present invention will be described in detail.

[1-1. Hardware Configuration of 3D Model Generating System]

Figure 1:
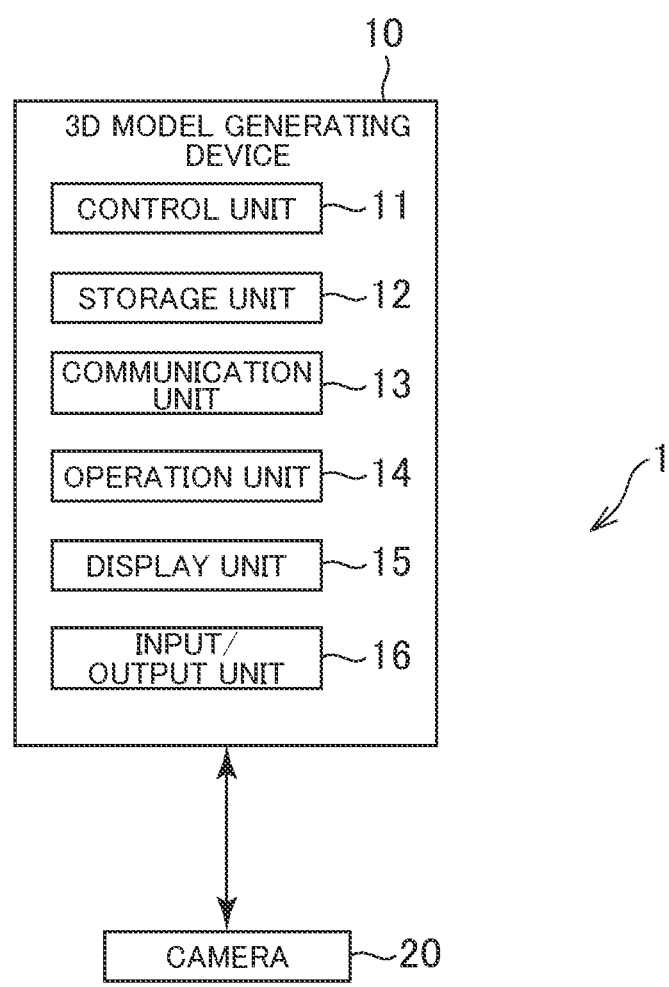
FIG. 1 is a diagram illustrating a hardware configuration of a 3D model generating system.

FIG. 1 is a diagram illustrating a hardware configuration of the 3D model generating system. As shown in FIG. 1, the 3D model generating system 1 includes a 3D model generating device 10 and a camera 20.

The 3D model generating device 10 is a computer to generate a 3D model, such as a personal computer, a mobile information terminal (including tablet computer), and a mobile phone (including smartphone). The 3D model generating device 10 includes a control unit 11, a storage unit 12, a communication unit 13, an operation unit 14, a display unit 15, and an input/output unit 16.

The control unit 11 includes, for example, one or more microprocessors. The control unit 11 executes processing according to a program or data stored in the storage unit 12. The storage unit 12 includes a main storage unit and an auxiliary storage unit. For example, the main storage unit is a volatile memory such as a RAM, and the auxiliary storage unit is a non-volatile memory such as a hard disk or a flash memory. The communication unit 13 is a wired or wireless communication interface for data communications through a network.

The operation unit 14 is an input device used for user's operation, and includes a pointing device, such as a touch panel and a mouse, and a keyboard. The operation unit 14 transmits an operation of the user to the control unit 11. The display unit 15 is, for example, a liquid crystal display unit or an organic EL display unit. The display unit 15 displays an image based on instructions from the control unit 11. The input/output unit 16 is an input/output interface, such as a USB port. The input/output unit 16 is used for data communication with external devices.

The program or data described as being stored in the storage unit 12 may be provided through a network. The hardware configuration of the 3D model generating device 10 is not limited to the above examples, and various types of hardware can be applied to the hardware configuration of the 3D model generating device 10. For example, the 3D model generating device 10 may include a reader (e.g., optical disc drive or memory card slot) for a computer-readable information storage medium. For example, the program or data stored in the information storage medium may be provided to the 3D model generating device 10 through the reader or the input/output unit 16.

The camera 20 is a common imaging device capable of capturing still images and moving images, and includes, for example, an image sensing device such as a CMOS image sensor and a CCD image sensor. The camera 20 generates image data of an image captured by the image sensing device and stores the data in a memory. The memory may be included in the camera 20, or a detachable flash memory, for example.

The camera 20 may be provided with a wide-angle lens or a fisheye lens, and have any value of a field angle and a focal distance. For example, the camera 20 may be an omnidirectional camera, or a camera with multiple lenses capable of shooting at least one of all horizontal directions and all vertical directions. In this embodiment, the camera 20 is provided with a wide-angle lens capable of shooting in 360 horizontal degrees and 180 vertical degrees. In other words, the camera 20 can generate a photographed image in which everything in the horizontal direction is captured in one shooting.

The 3D model generating system 1 of the embodiment 1 splits a panorama image of the inside of the room captured by the camera 20 into multiple images, generates a 3D model indicating a part of the room for each image, and arranges the generated 3D models in a virtual space. In this way, the 3D model generating system 1 can generate the 3D model of the whole room even if the shape of the room is complicated. This technique will be described in details below.

[1-2. Functions Implemented in Embodiment 1]

Figure 2:
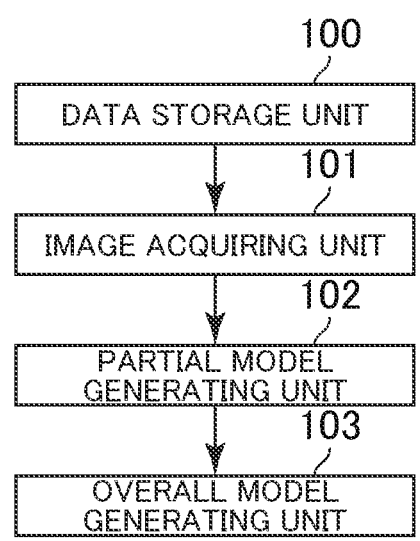
FIG. 2 is a functional block diagram showing an example of functions implemented in the 3D model generating system 1 of embodiment 1.

FIG. 2 is a functional block diagram showing an example of functions implemented in the 3D model generating system 1 of the embodiment 1. As shown in FIG. 2, in this embodiment, a case is explained in which a data storage unit 100, an image acquiring unit 101, a partial model generating unit 102, and an overall model generating unit 103 are implemented in the 3D model generating device 10.

[1-2-1. Data Storage Unit]

The data storage unit 100 is implemented mainly by the storage unit 12. The data storage unit 100 stores photographed image data indicating photographed images (photographs) captured by the camera 20. The photographed image may have any aspect ratio, size, and resolution. The photographed image data may also have any data format.

In this embodiment, a panorama image of 360 horizontal degrees is taken as an example of a photographed image. The photographed image may capture a predetermined range of the real space, and not necessarily capture an image of 360 horizontal degrees. For example, the photographed image may include the range of 180 or more and less than 360 horizontal degrees.

In this embodiment, a case is explained in which the photographed image data is stored in the data storage unit 100 of the 3D model generating device 10, although the photographed image data may be stored in other device or computer. For example, the photographed image data may be stored in a memory of the camera 20, or in a server computer.

[1-2-2. Image Acquiring Unit]

The image acquiring unit 101 is implemented mainly by the control unit 11. The image acquiring unit 101 acquires some images of the space surrounded by the surfaces in different directions.

The surfaces are surfaces of objects to divide the real space, and include, for example, wall, pillar, door, window, partition, fence, floor, ground, ceiling, and roof. The number of surfaces to surround the space may be any number more than one. That is, viewed from the camera 20, the surfaces may be positioned in at least two directions of forward/backward, left/right, and up/down. Each surface may be in contact with another surface, or away from another surface. In this embodiment, each surface is substantially orthogonal to at least one of the other surfaces. "Substantially orthogonal" means intersecting at right angles or intersecting at almost right angles (e.g., 80 degrees or more). For example, a corner is formed when two or more surfaces are substantially orthogonal to each other.

The space is an area having certain expanse in forward/backward, left/right, and up/down directions, and may be positioned on the ground or under the ground. For example, the space may be surrounded at least by a bottom surface and side surfaces, and may be entirely surrounded by front and back, left and right, and top and bottom surfaces indoors, or without a top surface outdoors. Alternatively, for example, even if the space is positioned indoors, the space is not necessarily surrounded by all the surfaces in the horizontal direction. It is sufficient that the space has side surfaces in at least two directions of front, back, up, and down (e.g., the space having front, left, and right surfaces, and no back surface).

In this embodiment, an indoor space surrounded by surfaces in all the front, back, left, right, up, and down directions is taken as an example. As such, the image acquiring unit 101 acquires a plurality of images captured inside the room. Further, a room surrounded by six or more side surfaces, each of which is substantially orthogonal to an adjacent surface, will be described as an example of the room. As such, the image acquiring unit 101 acquires a plurality of images of the room having six or more side surfaces that are substantially orthogonal to one another.

Figure 3:
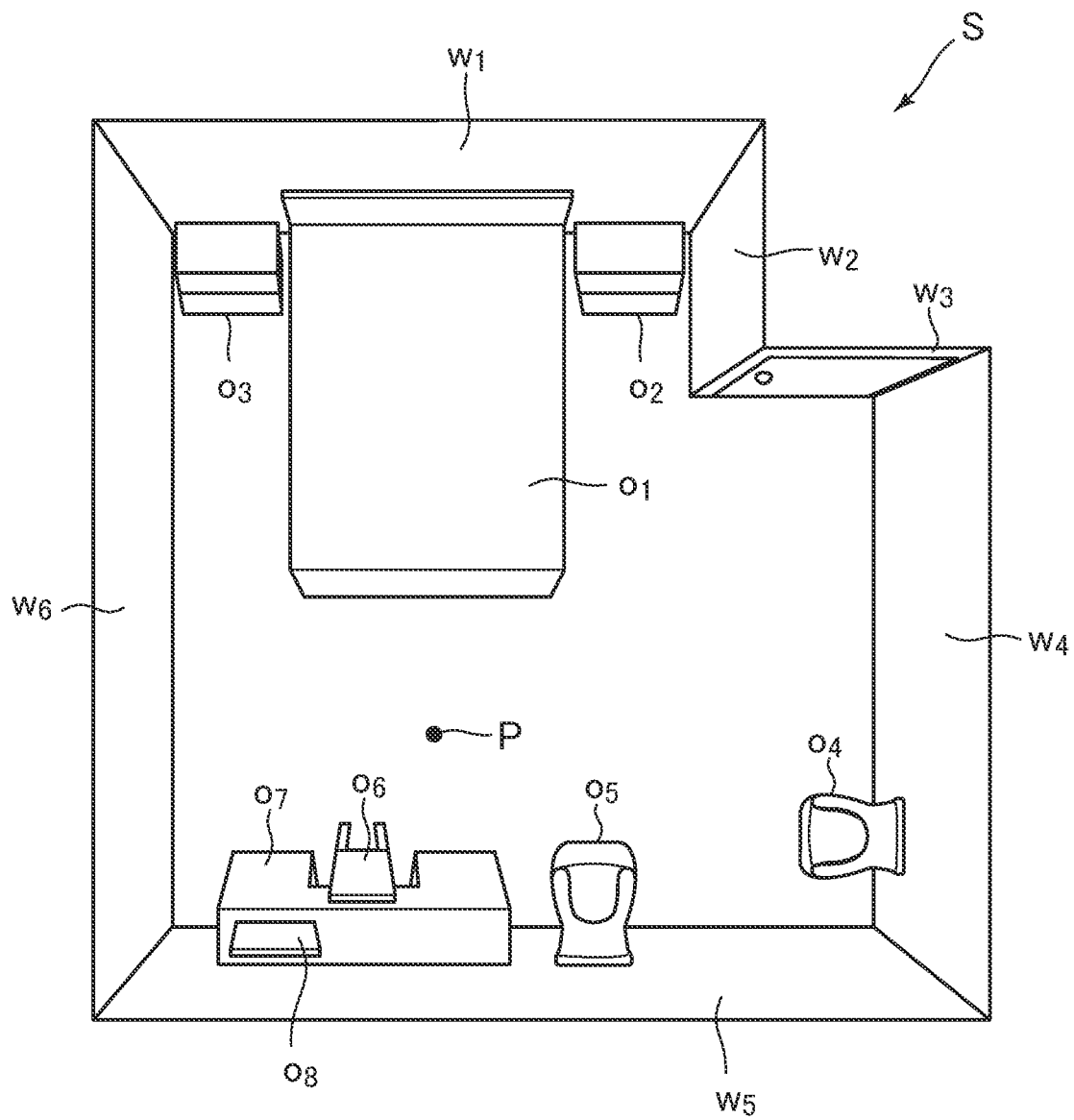
FIG. 3 is a diagram illustrating a view looking down on a room to be captured.

FIG. 3 is a view looking down on a room to be captured. In FIG. 3, a ceiling is omitted. As shown in FIG. 3, a room S includes walls $w_1$ to $w_6$ substantially orthogonal to one another, and objects $o_1$ to $o_8$.

In the following, the walls $w_1$ to $w_6$ will also be collectively described as walls W. In other words, it can be described as wall $W=\{w_i\}^{Nw}_{i=1}$. $N_w$ is the total number of the walls, and here $N_w=6$. The objects $o_1$ to $o_8$ are collectively described as objects O. In other words, it can be described as object $O=\{o_j\}^{No}_{j=1}$. $N_o$ is the total number of the objects, and here $N_o=8$.

The object can be a subject of the camera 20. In FIG. 3, the objects O are positioned in front of the walls W viewed from the camera 20. In other words, the objects O are subjects other than the walls W. For example, in a case of indoors, furniture and home appliances correspond to the objects O, and in a case of outdoors, a car and a bike correspond to the objects O. In the example shown in FIG. 3, the object $o_1$ is a bed, and the objects $o_2$ and $o_3$ are sideboards. The objects $o_4$ to $o_6$ are chairs, the object $o_7$ is a desk, and the object $o_8$ is a TV set.

A position of the camera 20 to capture an image may be any position within the room S. Here, a case is explained in which the room S is captured at a capturing position P where every object O can be captured.

Figure 4:
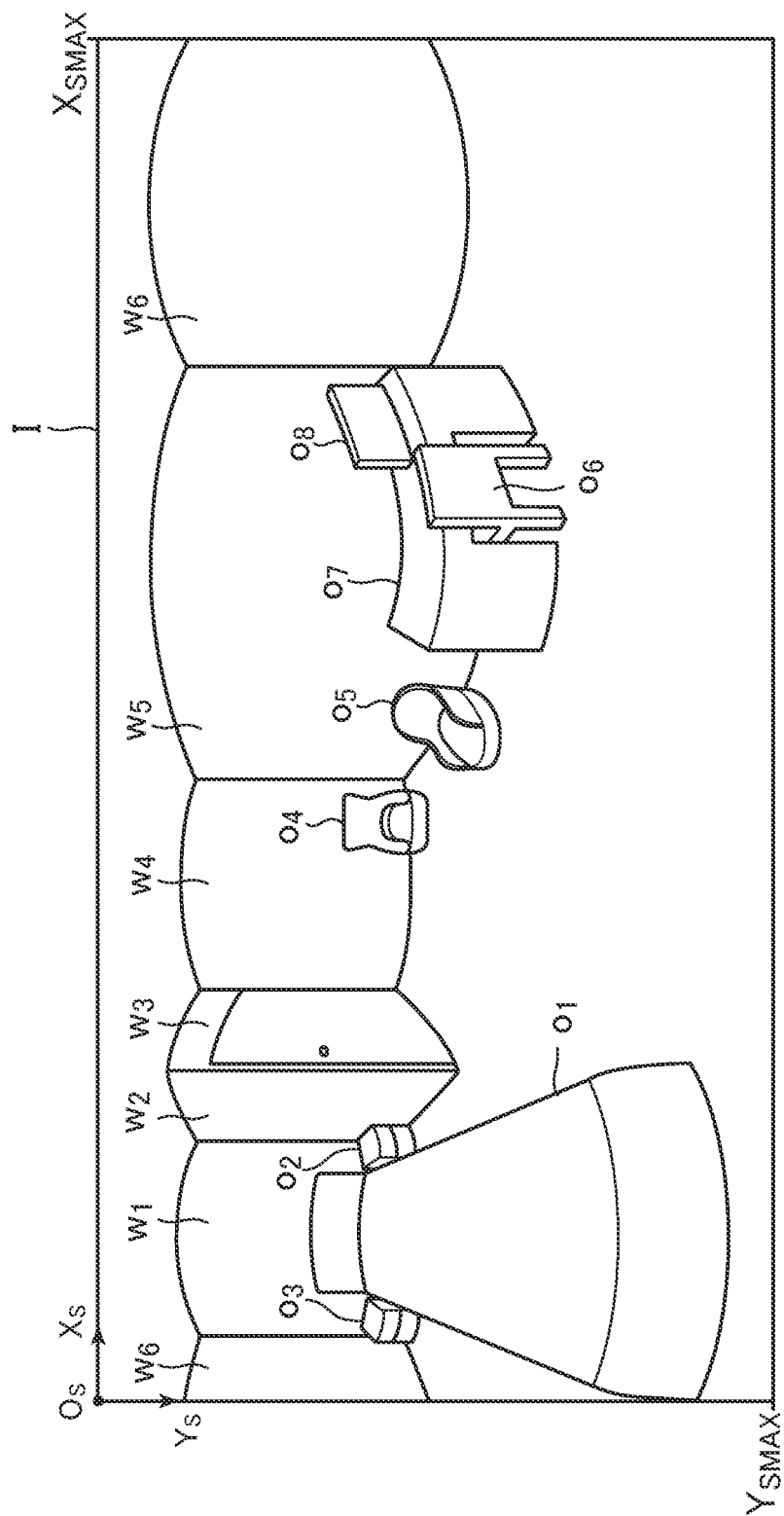
FIG. 4 is a diagram illustrating a photographed image of the room.

FIG. 4 is a diagram illustrating a photographed image of the room S. As described above, the camera 20 can capture 360 degrees horizontally. As shown in FIG. 4, the photographed image I thus includes everything in the horizontal direction viewed from the capturing position P. In other words, the photographed image I is a panorama image of 360 horizontal degrees captured from the capturing position P.

The photographed image I includes 2D coordinate axes (coordinate axes in a screen coordinate system). For example, the upper left vertex is set as the origin $O_S$, the horizontal direction is $X_S$-axis, and the vertical direction is $Y_S$-axis. The positions of pixels in the photographed image I are indicated by an $X_S$ coordinate and a $Y_S$ coordinate. For example, the right end $X_S$ coordinate in the photographed image I is set as $X_{SMAX}$, and the lower end $Y_S$ coordinate is set as $Y_{SMAX}$.

In this embodiment, the image acquiring unit 101 acquires a plurality of images based on a photographed image I in which a space surrounded by the walls W is captured. Here, the image acquiring unit 101 acquires a plurality of images based on the photographed image I capturing 360 horizontal degrees.

Figure 5:
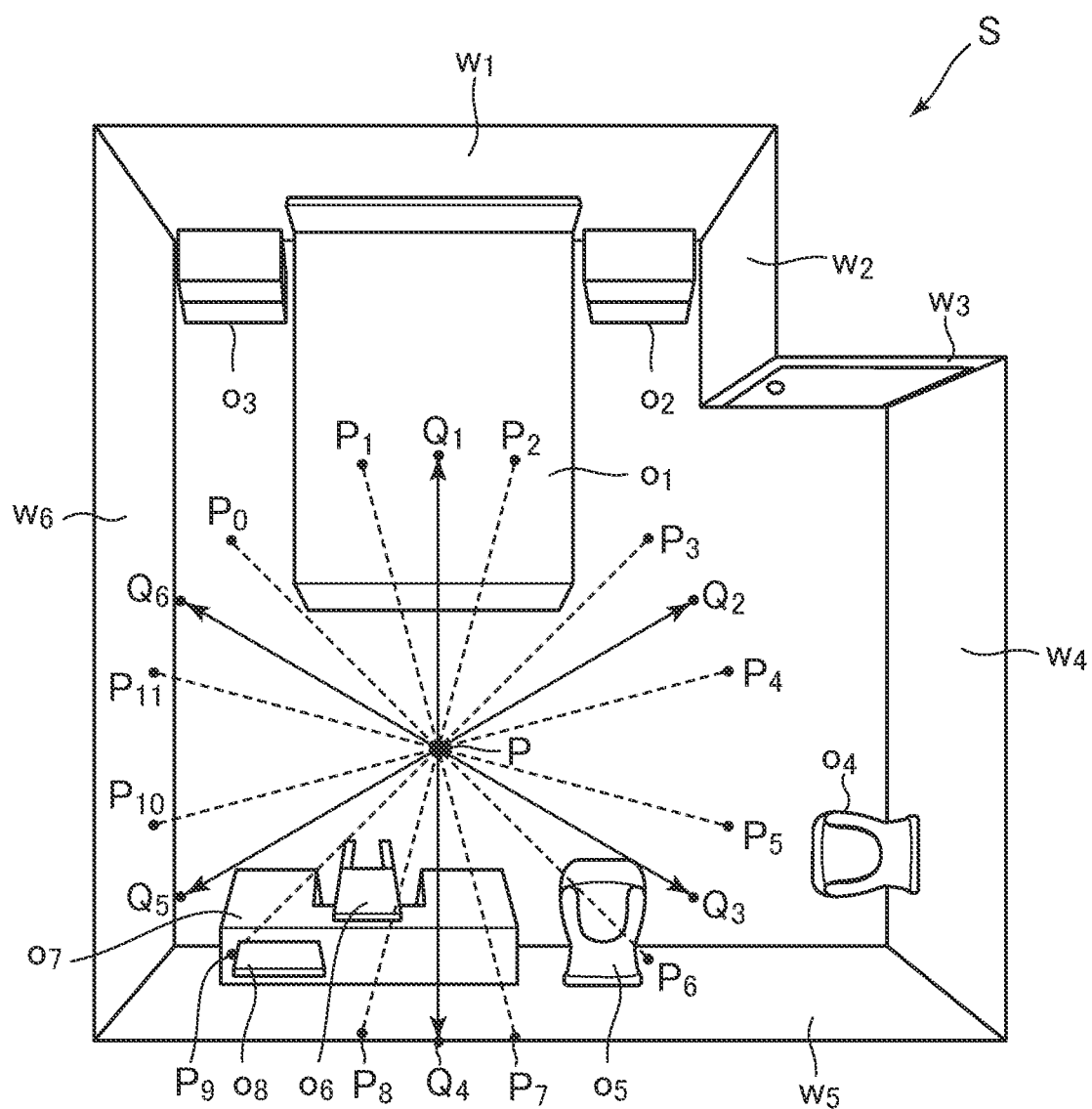
FIG. 5 is a diagram illustrating a method for acquiring images by an image acquiring unit.
Figure 6:
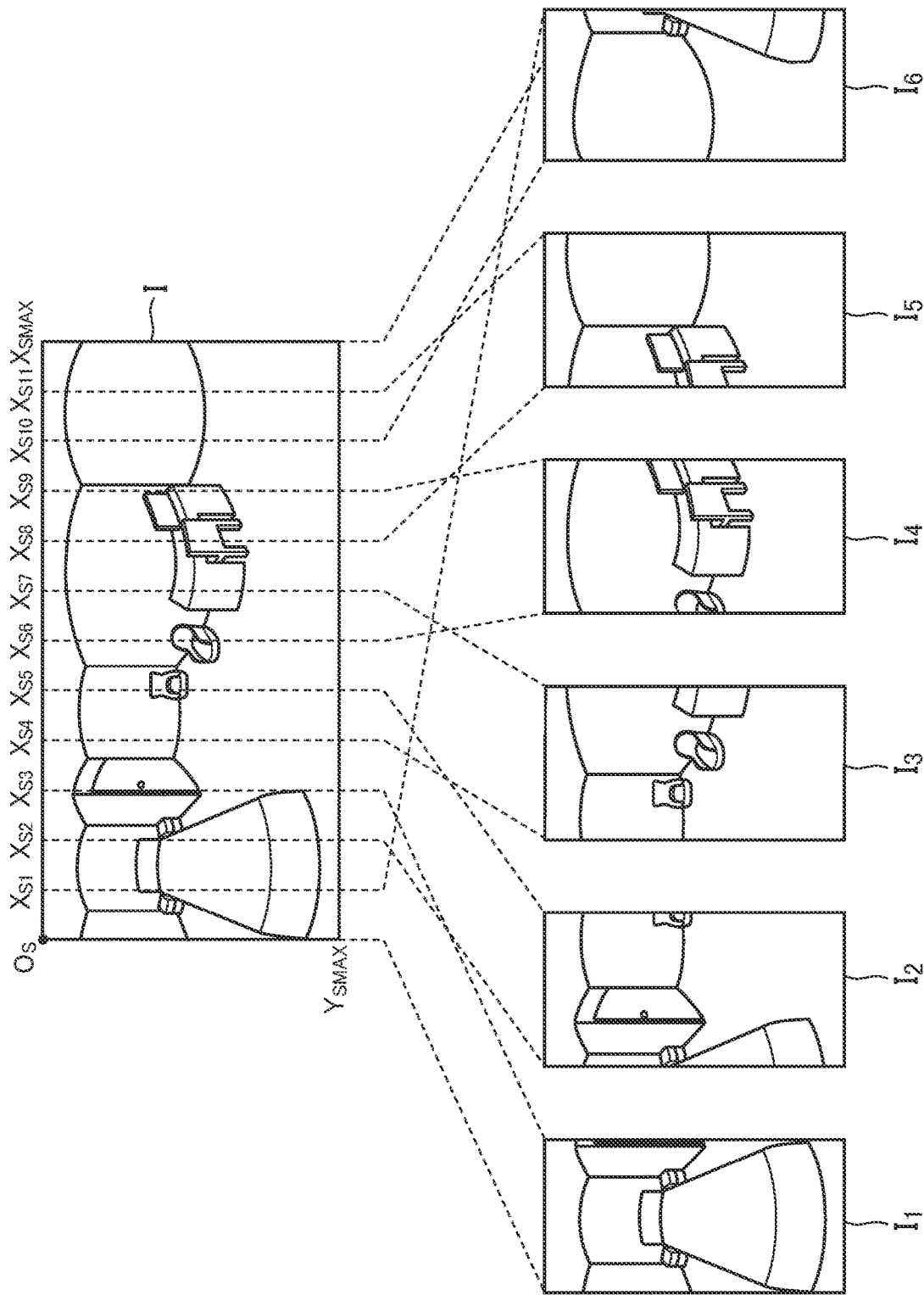
FIG. 6 is a diagram illustrating a method for acquiring images by an image acquiring unit.

FIGS. 5 and 6 are diagrams illustrating a method for acquiring images by the image acquiring unit 101. In FIG. 5, $P_0$ indicates a point of a direction of a subject captured in a pixel having the $X_S$ coordinate of 0 viewed from the capturing position P. As the $X_S$ coordinate of the photographed image I increases, the capturing direction changes from the point $P_0$ in a clockwise (right-handed) direction with the capturing position P at the center. Here, with the capturing position P at the center, when a circle with the segment P-$P_0$ as a radius is divided into 12 by 30 degrees each, points on the circle are set as $P_1$ to $P_{11}$.

As shown in FIG. 6, the image acquiring unit 101 splits a photographed image I to generate six images $I_1$ to $I_6$ having overlapped capturing ranges. The images $I_1$ to $I_6$ are also collectively called as images $I_k$. That is, it can be described as photographed image I=$\{I_k\}^K{}_{k=1}$. K is the total number of images, and here K=6. In FIG. 6, the image is divided into 12 at the $X_S$ coordinate values "0" to "$X_{SMAX}$", and respective $X_S$ coordinate values are set as "$X_{S1}$" to "$X_{S11}$".

For example, the image $I_1$ is a portion from the $X_S$ coordinates values "0" to "$X_{S3}$". The capturing range of the image $I_1$ has the point $Q_1$ (FIG. 5), which is the center point of the image $I_1$, as a gaze point, and the field angle of $\angle P_0PP_3$=90°. The image $I_2$ is a portion from the $X_S$ coordinate values "$X_{S2}$" to "$X_{S5}$". The capturing range of the image $I_2$ has the point $Q_2$ (FIG. 5), which is the center point of the image $I_2$, as a gaze point, and the field angle of $\angle P_2PP_5$=90°. The image $I_1$ and the image $I_2$ have the overlapped capturing range from the $X_S$ coordinate value "$X_{S2}$" to the $X_S$ coordinate value "$X_{S3}$" (capturing range having the field angle of $\angle P_2PP_3$=30°).

The image $I_3$ is a portion from the $X_S$ coordinate value "$X_{S4}$" to the $X_S$ coordinate value "$X_{S7}$". The capturing range of the image $I_3$ has the point $Q_3$ (FIG. 5), which is the center point of the image $I_3$, as a gaze point, and the field angle of $\angle P_4PP_7$=90°. The image $I_2$ and the image $I_3$ have the overlapped capturing range from the $X_S$ coordinate value "$X_{S4}$" to the $X_S$ coordinate value "$X_{S5}$" (capturing range having the field angle of $\angle P_4PP_5$=30°). The image $I_4$ is a portion from the $X_S$ coordinate value "$X_{S6}$" to the $X_S$ coordinate value $X_{S9}$. The capturing range of the image $I_4$ has the point $Q_4$ (FIG. 5), which is the center point of the image $I_4$, as a gaze point, and the field angle of $\angle P_6PP_9$=90°. The image $I_3$ and the image $I_4$ have the overlapped capturing range from the $X_S$ coordinate value "$X_{S6}$" to the $X_S$ coordinate value "$X_{S7}$" (capturing range having the field angle of $\angle P_6PP_7$=30°).

The image $I_5$ is a portion from the $X_S$ coordinate value "$X_{S8}$" to the $X_S$ coordinate value "$X_{S11}$". The capturing range of the image $I_5$ has the point $Q_5$ (FIG. 5), which is the center point of the image $I_5$, as a gaze point, and the field angle of $\angle P_8PP_{11}$=90°. The image $I_4$ and the image $I_5$ have the overlapped capturing range from the $X_S$ coordinate value "$X_{S8}$" to the $X_S$ coordinate value "$X_{S9}$" (capturing range having the field angle of $\angle P_8PP_9$=30°). The image $I_6$ combines the portion from the $X_S$ coordinate value "$X_{S10}$" to the $X_S$ coordinate value "$X_{SMAX}$" and the portion from the $X_S$ coordinate value "0" to the $X_S$ coordinate value "$X_{S1}$". The capturing range of the image $I_6$ has the point $Q_6$ (FIG. 5), which is the center point of the image $I_6$, as a gaze point, and the field angle of $\angle P_{10}PP_1$=90°. The image $I_6$ and the image $I_1$ have the overlapped capturing range from the $X_S$ coordinate value "0" to the $X_S$ coordinate value "$X_{S1}$" (capturing range having the field angle of $\angle P_0PP_1$=30°).

As described above, in this embodiment, each image $I_k$ has a capturing range that partially overlaps a capturing range of at least one of other images $I_k$. The overlapped portion is not limited to having the field angle of 30 degrees, but may have any size. Further, the case has been explained in which all of the overlapped portions have the same size, although the overlapped portions may have different sizes for respective images $I_k$. In addition, the case has been explained in which sizes of the respective images $I_k$ are the same, although the sizes may be different from one another.

The photographed image I according to this embodiment includes multiple directions of the room S, and thus the image acquiring unit 101 acquires multiple images $I_k$ respectively capturing different directions of the room S. Further, the image acquiring unit 101 acquires the images $I_k$ in which different directions of the room S are captured from a point in the room S. In other words, the image acquiring unit 101 acquires the images $I_k$ respectively having different capturing directions from the capturing position P.

In this embodiment, the case has been explained in which a plurality of images $I_k$ are generated from a single photographed image I, although a plurality of images $I_k$ may be generated by capturing images multiple times with camera 20. In this case, for example, when the camera 20 captures a predetermined capturing direction from the capturing position P, then the camera 20 may rotate by a predetermined angle at the capturing position P to capture another image. Subsequently, the rotations and capturing of images may be repeated to generate a plurality of images $I_k$ in which a predetermined angle (e.g., 360 degrees) from the capturing position P in the horizontal direction are captured.

[1-2-3. Partial Model Generating Unit]

The partial model generating unit 102 is implemented mainly by the control unit 11. The partial model generating unit 102 generates a partial model representing a part of the walls W captured in an image $I_k$ for each image $I_k$. The partial model is a 3D model representing one or more walls. The 3D model is a two-dimensional or a three-dimensional model formed of polygons.

The partial model generating unit 102 specifies a flat portion in the image $I_k$, and generates a partial model based on the shape and the orientation of the flat portion. The flat portion may be a flat surface having a predetermined shape and a predetermined size. For example, the wall W has a square shape, and thus the partial model generating unit 102 specifies a square surface in the image $I_k$. For example, the partial model generating unit 102 may extract a segment indicating an outline of a subject in the image $I_k$, and generate a partial model based on a positional and directional relationship of the segment.

Various known techniques may be applicable to the method for generating a 3D model of a subject in an image $I_k$. Here, as an example, a method using an orientation map as described in a journal article by Lee, D. C., Hebert, M., Kanade, T. entitled "Geometric reasoning for single image structure recovery. In: CVPR." (2009).

Figure 7:
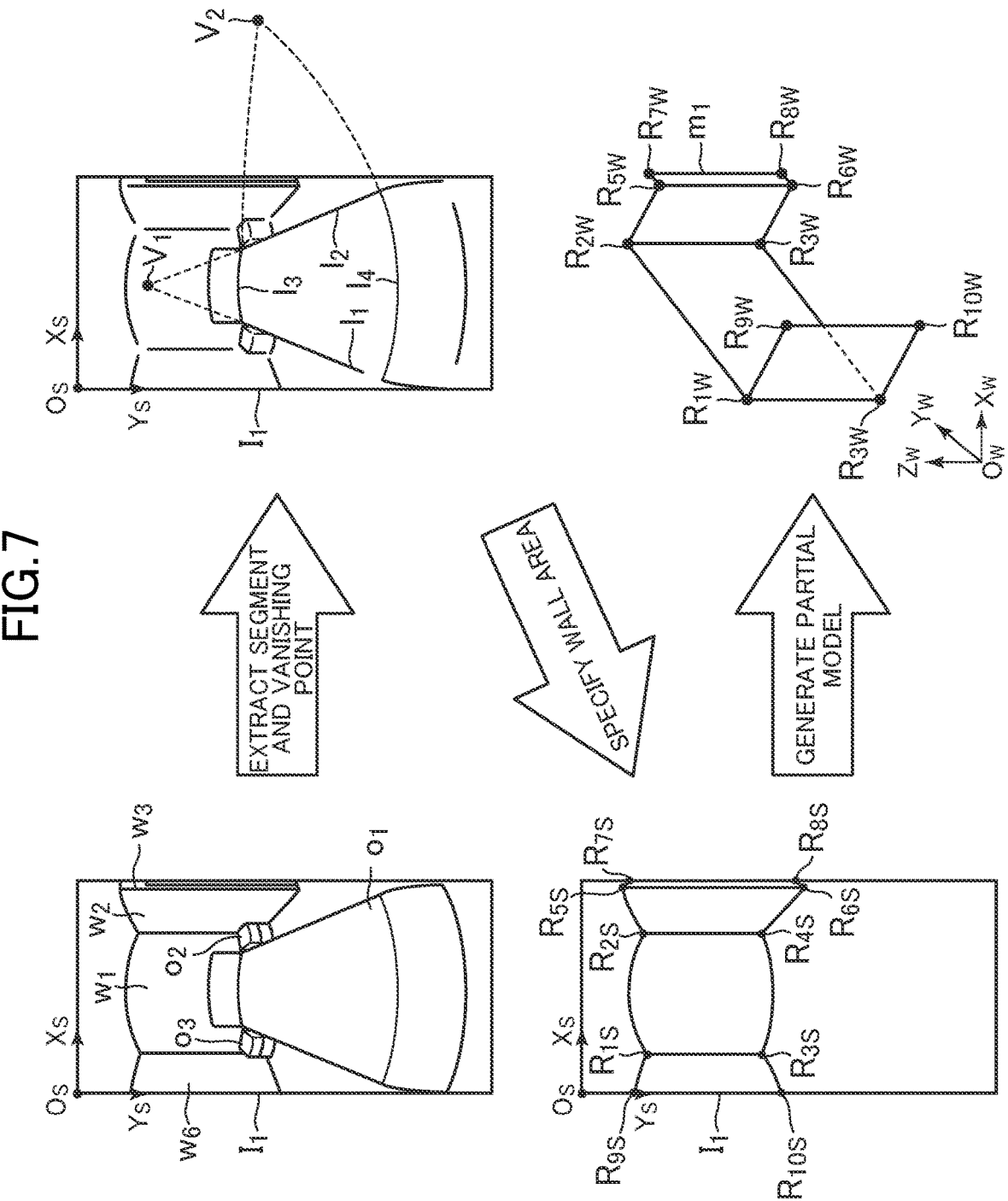
FIG. 7 is a diagram illustrating a process of generating a partial model.

FIG. 7 is a diagram illustrating a process of generating a partial model. Here, a case is explained in which a partial model $m_1$ indicating the walls $w_1$, $w_2$, $w_3$, and $w_6$ captured in an image $I_1$ is generated from the image $I_1$. As shown in FIG. 7, the partial model generating unit 102 extracts a segment and a vanishing point in the image $I_1$ (step 1), specifies an area of the walls W from an orientation map corresponding to the image $I_1$ (step 2), and generates a partial model $m_1$ based on the specified area of the walls W (step 3). The steps 1 to 3 will be described in detail below.

[Step 1]

The partial model generating unit 102 specifies a segment in the image $I_1$ by performing edge detection processing on the image $I_1$. In the real space, even a straight line appears to be curved through a fisheye lens, and thus a segment to be detected may be a straight line or a curved line. Various known techniques may be applicable to the edge detection processing. For example, when a difference between a pixel value of a target pixel and pixel values of pixels around the target pixel is a threshold value or more, the partial model generating unit 102 may specify the target pixel as an edge pixel. The partial model generating unit 102 detects the edge pixel in the image $I_1$, and extracts the pixels formed by connecting adjacent edge pixels as a segment.

In this embodiment, the walls W intersect with each other by substantially 90 degrees, and, when viewed from the capturing position P, the surfaces of the walls W are oriented in any of front and back, left and right, and up and down directions, and the outlines of the walls W are also oriented in any of front and back, left and right, and up and down directions. As such, based on a direction (inclination) of the extracted segment, the partial model generating unit 102 classifies the segment into any of front and back, left and right, and up and down directions.

For example, when an absolute value of an inclination of a segment is 0 ($X_S$-axis direction) or more and less than a first threshold value (e.g., about 20 degrees), the partial model generating unit 102 classifies the segment into the left and right direction. That is, if the segment is oriented in a horizontal direction in the image $I_1$, the segment shows an outline in the left and right direction viewed from the capturing position P, and thus the segment is classified into the left and right direction.

When an absolute value of an inclination of a segment is the first threshold value or more and less than a second threshold value (e.g., about 70 degrees), the partial model generating unit 102 classifies the segment into the front and back direction. That is, if the segment is oriented in an oblique direction in the image $I_1$, the segment shows an outline in the front and back direction viewed from the capturing position P, and thus the segment is classified into the front and back direction. In this regard, the first threshold value and the second threshold value may be determined in view of the degree of distortion of the image due to the lens of the camera 20.

When an absolute value of an inclination of a segment is the second threshold value or more, the partial model generating unit 102 classifies the segment into the up and down direction. That is, if the segment is oriented in a vertical direction in the image $I_1$, the segment shows an outline in the up and down direction viewed from the capturing position P, the segment is classified into the front and back direction.

When a direction of each segment is classified as described above, the partial model generating unit 102 extends each segment. The partial model generating unit 102 may extend each segment to the edge of the image $I_1$, or until each segment intersects with another segment. An intersection of the extended segments is a candidate of a corner. As such, the partial model generating unit 102 takes an area surrounded by the extended lines as a candidate of a wall W. In other words, the partial model generating unit 102 extracts intersections of the extended lines, and takes an area surrounded by some intersections as a candidate of a wall W. The candidates of walls W include something that is not actually a wall W. Such a candidate has a lower degree of matching with the orientation map as described later. As such, areas of real walls W can be narrowed down by using the orientation map.

In this embodiment, the partial model generating unit 102 utilizes a vanishing point to acquire the orientation map. The partial model generating unit 102 acquires a vanishing point from the image $I_1$ based on the extracted segments. The vanishing point is a point on which objects oriented in the same direction in the real space intersect each other on an image, and can be described as indicating infinity. For example, when someone stands on two parallel railway lines to capture the railway lines, those railway lines do not actually intersect with each other, although the railway lines are captured in such a manner that they are opposed to each other on the image. The intersection point of the extended two railway lines is a vanishing point.

In the example shown in FIG. 7, the partial model generating unit 102 acquires the intersection of the extended segments $l_1$ and $l_2$, which are classified as the front and back direction, as a vanishing point $v_1$ of the front and back direction. Further, the partial model generating unit 102 acquires a point $v_2$, on which the extended segments $l_3$ and $l_4$ classified as the left and right direction intersect with each other, as a vanishing point $v_2$ of the left and right direction. In the image $I_1$, the segments in the up and down direction are parallel to each other and do not intersect, and thus a vanishing point of the up and down direction is described as not being detected.

The partial model generating unit 102 generates an orientation map based on the positional relationship between the segments and the vanishing points. The orientation map of the image $I_1$ shows orientations of surfaces of subjects in pixels for each pixel. In this embodiment, the orientation map indicates in which one of the front and back, left and right, and up and down directions each pixel is oriented. Various known techniques may be applicable to the method for generating the orientation map. In this embodiment, as an example, a method for moving the segments to the vanishing point will be described.

For example, the surfaces of the floor and the ceiling of the room S are oriented in the up and down direction, and the outlines of the floor and the ceiling are indicated by the segments in the front and back direction and the segments in the left and right direction. As such, when moving a segment, which is in the front and back direction and placed at a position between the segments in the left and right direction, to the vanishing point $v_2$ in the horizontal direction until the segment intersects with another segment, the partial model generating unit 102 relates the up and down direction to pixels through which the segment passes.

For example, since the surfaces of the walls $w_1$ and $w_3$ are oriented in the front and back direction, the outlines of the walls $w_1$ and $w_3$ are represented by the segments in the left and right direction and the segments in the up and down direction. As such, when moving a segment, which is in the up and down direction and placed at a position between the segments in the left and right direction, to the vanishing point $v_2$ in the horizontal direction until the segment intersects with another segment, the partial model generating unit 102 relates the front and back direction to pixels through which the segment passes.

For example, the surfaces of the walls $w_2$ and $w_6$ are oriented in the left and right direction, the outlines of the walls $w_2$ and $w_6$ are represented by the segments in the front and back direction and the segments in the up and down direction. As such, when moving a segment, which is in the up and down direction and placed at a position between the segments in the front and back direction, to the vanishing point $v_2$ in the horizontal direction until the segment intersects with another segment, the partial model generating unit 102 relates the left and right direction to pixels through which the segment passes.

[Step 2]

As described above, the partial model generating unit 102 specifies the directions of respective pixels in the image $I_1$, and generates the orientation map. The partial model generating unit 102 then specifies the directions of the surfaces of the candidates of the walls W based on the directions of the segments forming the candidates by using the similar method for generating the orientation map. The partial model generating unit 102 specifies areas of the real walls W based on the degree of matching calculated by comparing the directions of the candidates of the walls W with the directions indicated by the orientation map in the candidates. The degree of matching may be calculated based on the number of pixels having the same direction or the rate of those pixels.

In FIG. 7, the partial model generating unit 102 specifies a candidate surrounded by the points $R_{1S}$, $R_{2S}$, $R_{3S}$, and $R_{4S}$ in the image $I_1$ as the wall $w_1$. The partial model generating unit 102 specifies a candidate surrounded by the points $R_{2S}$, $R_{5S}$, $R_{6S}$, and $R_{4S}$ in the image $I_1$ as the wall $w_2$. The partial model generating unit 102 specifies a candidate surrounded by the points $R_{5S}$, $R_{6S}$, $R_{7S}$, and $R_{8S}$ in the image $I_1$ as the wall $w_3$. The partial model generating unit 102 specifies a candidate surrounded by the points $R_{1S}$, $R_{3S}$, $R_{9S}$, and $R_{10S}$ in the image $I_1$ as the wall $w_6$.

[Step 3]

The partial model generating unit 102 performs a predetermined coordinate conversion on each area extracted from the image $I_1$ to generate a partial model $m_1$. The coordinate conversion is a matrix conversion to convert 2D coordinates into 3D coordinates. For example, the partial model generating unit 102 converts the 2D coordinates of the points $R_{1S}$ to $R_{10S}$, which indicate vertexes of the walls specified in the image $I_1$, into the 3D coordinates in the virtual space to obtain points $R_{1W}$ to $R_{10W}$. In a case of the conversion into 3D coordinates, the height of the partial model $m_1$ may be a predetermined height. In other words, the size of the partial model $m_1$ may be determined in advance in the embodiment 1.

In this embodiment, as shown in FIG. 7, 3D coordinate axes (coordinate axes in a world coordinate system) are defined in the virtual space. For example, any one of positions is set as the origin $O_W$, and three coordinate axes of $X_W$ axis-$Y_W$ axis-$Z_W$ axis, which are orthogonal to one another, are defined. Each position in the virtual space is defined by the 3D coordinates. The partial model generating unit 102 couples the points $R_{1W}$ to $R_{10W}$, which are converted into the 3D coordinates, to generate the partial model $m_1$. That is, the points $R_{1W}$ to $R_{10W}$ are vertexes of the partial model $m_1$.

With the steps 1 to 3 described above, the partial model $m_1$ is generated from the image $I_1$. As described above, the steps 1 to 3 are merely an example of the process to generate the partial model $m_1$, and various known techniques may be applicable to the process to generate the partial model $m_1$ from the image $I_1$. The partial model generating unit 102 performs the same process as that of the image $I_1$ on the images $I_2$ to $I_6$ to generate partial models respectively corresponding to the images $I_2$ to $I_6$.

Figure 8:
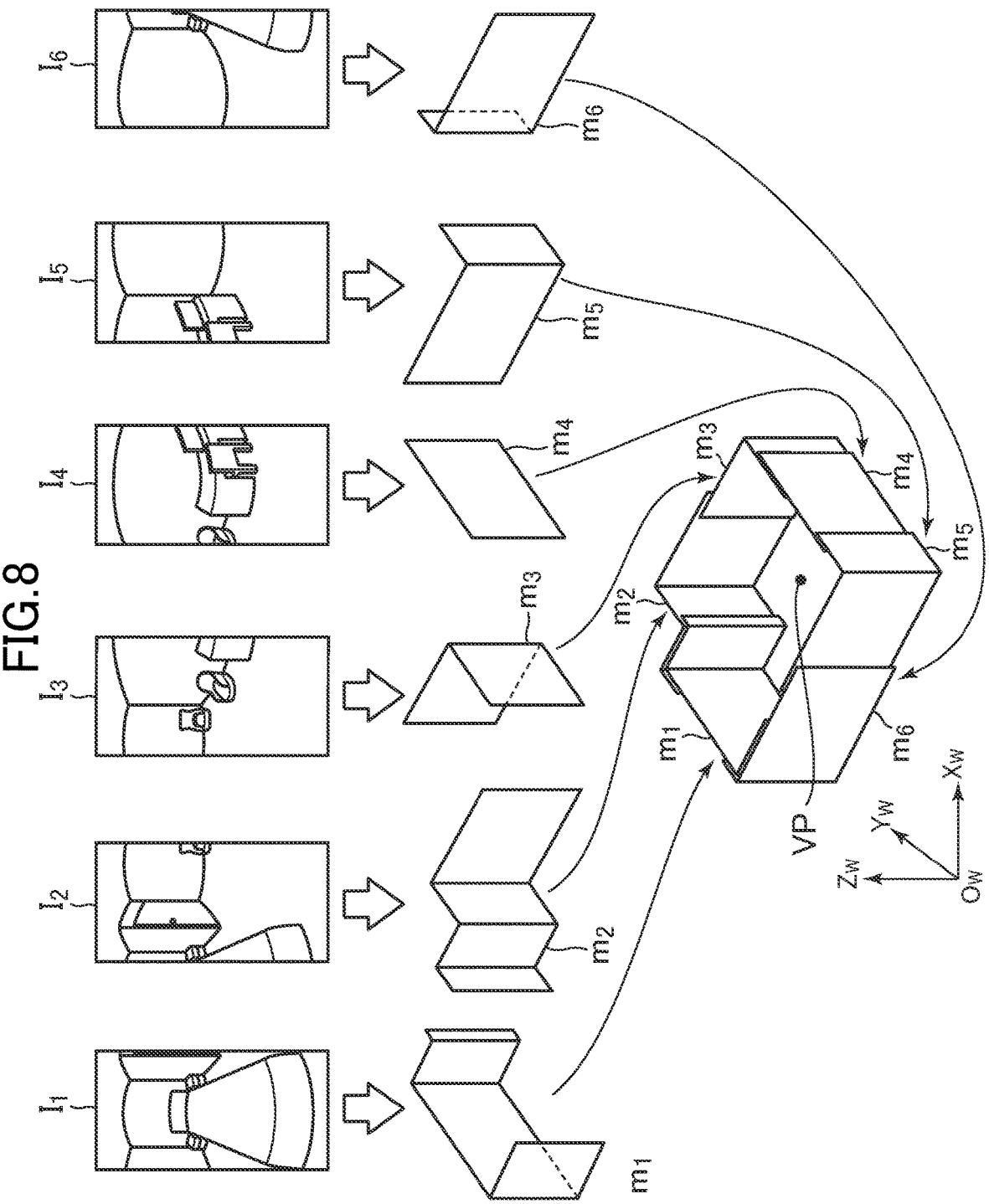
FIG. 8 is a diagram illustrating partial models generated from respective images.

FIG. 8 is a diagram illustrating the partial models generated from respective images $I_k$. As shown in FIG. 8, the partial model generating unit 102 generates partial models $m_1$ to $m_6$ (hereinafter also collectively referred to as "partial models $m_k$") representing the partial walls W captured in the respective images $I_k$. In this embodiment, the walls W are substantially orthogonal to one another, and as shown in FIG. 8, each corner represents a substantially right angle in the partial models $m_k$.

In this embodiment, each image $I_k$ has a capturing range partially overlapping with a capturing range of at least one of other images $I_k$. As such, as shown in FIG. 8, the partial model generating unit 102 generates a partial model $m_k$ having a surface partially overlapping with a surface of at least one of other partial models $m_k$. Since the room S is described as an example of a space, the partial model generating unit 102 generates a partial model representing a part of the room S. In addition, a case is described in which the room S has six or more side surfaces, and thus the partial model generating unit 102 generates a partial model representing a part of six or more side surfaces.

[1-2-4. Overall Model Generating Unit]

The overall model generating unit 103 is implemented mainly by the control unit 11. The overall model generating unit 103 generates an overall model representing all of the walls W based on the partial models $m_k$ generated by the partial model generating unit 102. The overall model generating unit 103 generates an overall model by arranging the partial models $m_k$ in the virtual space in a way to correspond to the arrangement of the actual walls W. The partial models $m_k$ may be disposed in positions and orientations specified by a user, but here, the overall model generating unit 103 determines positions and orientations of the partial models $m_k$ so that the positional relationship of the actual walls W corresponds to the positional relationship of the partial models $m_k$. The correspondence of the positional relationships means that the positional relationships are matched, or a difference between the positional relationships is less than a threshold value.

In this embodiment, in order to determine where and in which direction each partial model $m_k$ is arranged, the overall model generating unit 103 acquires image information regarding a capturing direction of each image $I_k$. It is sufficient that the image information can specify capturing directions, and may directly indicate capturing direction similarly to vector information, or indirectly indicate capturing direction as described later.

For example, in a case where the photographed image I is split to acquire the images $I_k$, a capturing direction of each image $I_k$ can be specified according to a position of each image $I_k$ in the photographed image I (i.e., according to where each image $I_k$ is located in the photographed image I). As such, in this embodiment, a case will be explained in which a position of each image $I_k$ in a single photographed image I corresponds to the image information. Specifically, when taking the capturing direction of the image $I_1$ on the left edge of the photographed image I (the direction from the capturing position P to the point $Q_1$ in FIG. 5) as a reference, the capturing direction of the image $I_2$ on the right side of the image $I_1$ (the direction from the capturing position P to the point $Q_2$ in FIG. 5) is further rightward than the capturing direction of the image $I_1$. Similarly, capturing directions of the respective images $I_3$ to $I_6$ on the right side of the images $I_1$ and $I_2$ are obtained by rotating the capturing directions of the images $I_1$ and $I_2$ rightward. In this way, relative capturing directions can be specified based on a position of each image $I_k$ in the photographed image I. As such, here, the overall model generating unit 103 refers to a position (e.g., $X_S$ coordinate value) of each image $I_k$ in the photographed image I so as to acquire the image information.

The overall model generating unit 103 determines positions and orientations of the partial models $m_k$ corresponding to the respective images $I_k$ based on the image information of the images $I_k$, and generates the overall model. In other words, here, the overall model generating unit 103 determines a position and an orientation of a partial model $m_k$ corresponding to an image $I_k$ based on the position of the image $I_k$ in the photographed image I.

For example, the overall model generating unit 103 determines a position and an orientation of a partial model $m_k$ so that a direction from a reference point in the virtual space to the partial model $m_k$ corresponds to a capturing direction of an image $I_k$ corresponding to the partial model $m_k$. The correspondence of the directions means that the directions are matched, or a difference between the directions is less than a threshold value. The reference point may be any position in the virtual space, and here, is a position of a virtual camera VP, which corresponds to the capturing position P of the camera 20. The virtual camera VP is a virtual viewpoint for generating a virtual image in which the virtual space is drawn.

The relationship between the positions of the images $I_k$ and the positions and orientations of the partial models $m_k$ may be described in a program code in advance, or stored in the data storage unit 100 as data in a numerical format or in a table format. The relationship defines the positions and orientations of the partial models $m_k$ such that the arrangement order of the images $I_k$ in the photographed image I matches the arrangement order of the partial models $m_k$ viewed from the virtual camera VP. The overall model generating unit 103 disposes a partial model $m_k$ corresponding to an image $I_k$ based on a position and an orientation associated with the position of the image $I_k$.

As shown in FIG. 8, the overall model generating unit 103 disposes the partial models $m_k$ so as to surround the virtual camera VP, which is a reference point, based on the arrangement order of the images $I_k$ in the photographed image I. More specifically, the overall model generating unit 103 disposes the partial model $m_1$ corresponding to the image $I_1$ at the position a predetermined distance away from the virtual camera VP in a predetermined direction such that the partial model $m_1$ faces the virtual camera VP. Subsequently, the overall model generating unit 103 disposes the partial model $m_2$, which corresponds to the image $I_2$ adjacent to the image $I_1$, at the position adjacent to the partial model $m_1$ such that the partial model $m_2$ faces the virtual camera VP. Similarly, the overall model generating unit 103 disposes the partial models $m_3$ to $m_6$ clockwise in order such that the partial models $m_3$ to $m_6$ face the virtual camera VP. In this way, the overall model generating unit 103 generates an overall model based on the partial models $m_k$ disposed so as to surround the virtual camera VP.

Figure 9:
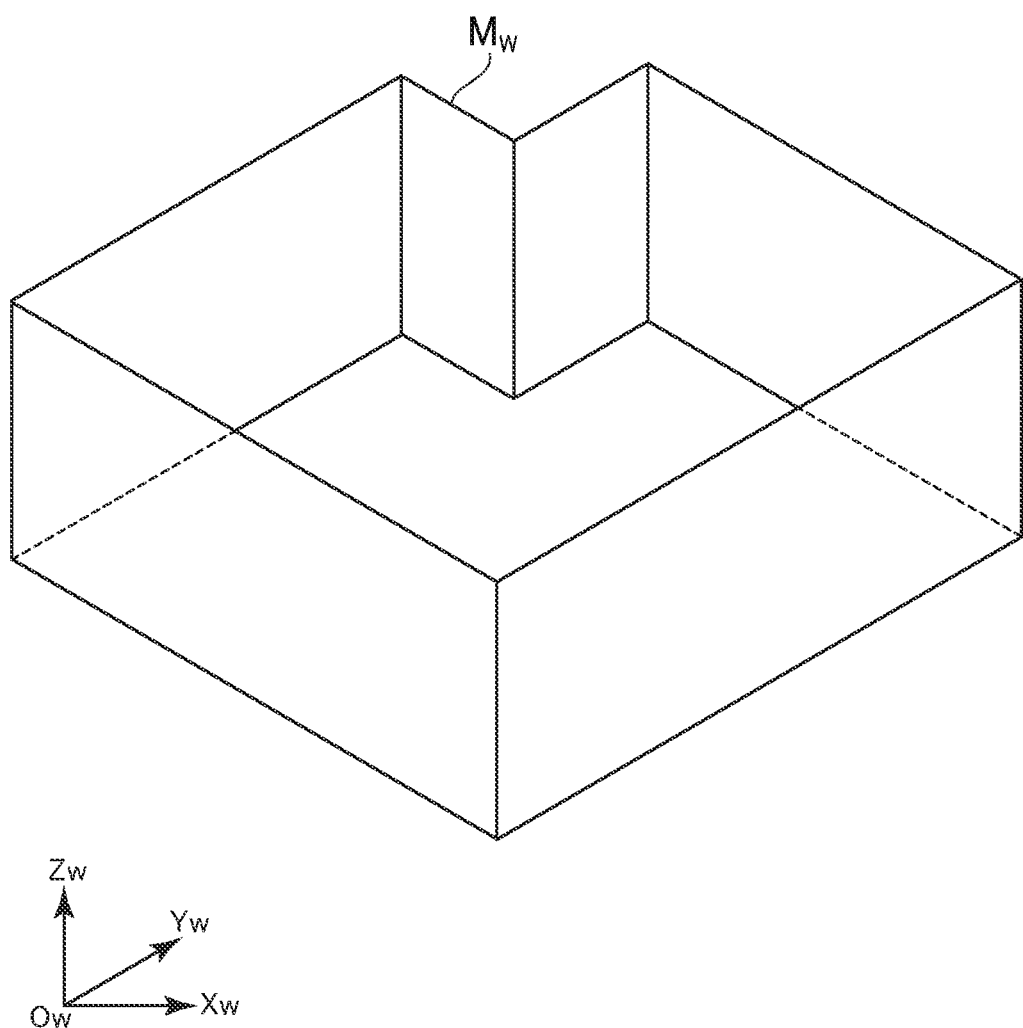
FIG. 9 is a diagram illustrating an example of an overall model.

FIG. 9 is a diagram illustrating an example of the overall model. As shown in FIG. 9, the overall model generating unit 103 synthesizes the surfaces of the arranged partial models $m_k$ to perform plane fitting, and generates an overall model $M_W$. The plane fitting process is a process to smooth a surface, and may be performed by setting a position obtained by averaging positions on two surfaces to a new surface. As such, the overall model $M_W$ is a 3D model that reproduces an overall shape of the walls W.

In this embodiment, each partial model $m_k$ overlaps at least one of other partial models $m_k$, and thus the overall model generating unit 103 positions the overlapped portions of the partial models $m_k$ to generate the overall model $M_W$. Further, since the room S has six or more side surfaces, the overall model generating unit 103 generates the overall model $M_W$ representing all of the six or more side surfaces.

4. Processing Executed in this Embodiment

Figure 10:
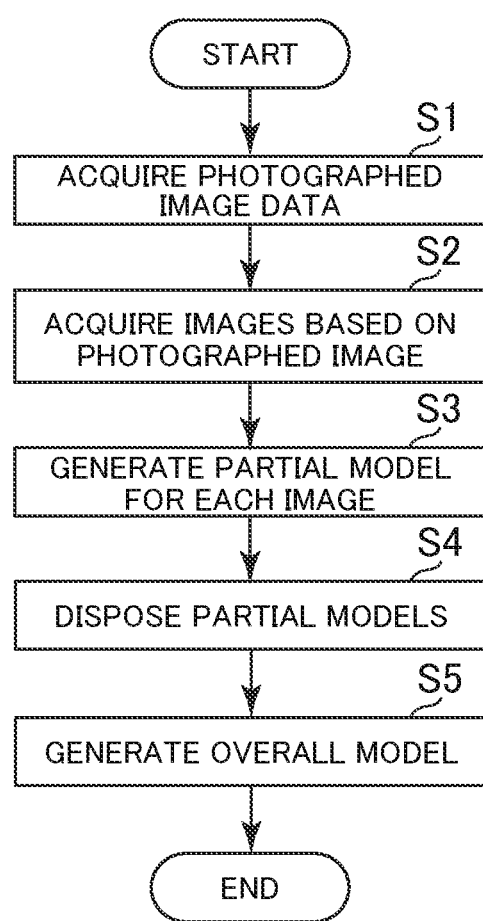
FIG. 10 is a flow chart showing an example of processing executed in the 3D model generating system.
3D model generating system.

FIG. 10 is a flow chart showing an example of the processing executed in the 3D model generating system. The processing shown in FIG. 10 is executed when the control unit 11 operates according to a program stored in the storage unit 12. The processing described below is an example of processing executed by function blocks shown in FIG. 2.

As shown in FIG. 10, the control unit 11 acquires photographed image data of the room S (S1). The photographed image data may be stored in the storage unit 12, or in a memory of the camera 20. Alternatively, the photographed image data may be stored in an information storage medium connected to the 3D model generating device 10, or in a server computer, for example.

The control unit 11 acquires a plurality of images $I_k$ based on the photographed image I indicated in the photographed image data acquired in S1 (S2). In S2, the control unit 11 splits the photographed image I at predetermined positions, thereby acquiring the images $I_k$. The positions to split the image are determined in advance, and information about the positions may be stored in the storage unit 12.

The control unit 11 generates a partial model $m_k$ for each image $I_k$ acquired in S2 (S3). In S3, the control unit 11 may generate the partial models $m_k$ indicating portions of the walls W captured in the images $I_k$ by using the orientation map as described above, for example.

The control unit 11 disposes the partial models $m_k$ generated in S3 in the virtual space (S4). In S4, the control unit 11 disposes a partial model $m_k$ corresponding to an image $I_k$ in the virtual space such that a position and an orientation of the partial model $m_k$ correspond to the position of the image $I_k$ in the photographed image I.

The control unit 11 generates the overall model $M_W$ based on the partial models $m_k$ disposed in S4 (S5), and the processing terminates. In S5, the control unit 11 synthesizes the overlapped portions of the partial models $m_k$ to perform plane fitting on the surfaces, thereby generating the overall model $M_W$.

According to the 3D model generating system 1 of the embodiment 1, a partial model $m_k$ is generated for each image $I_k$ and an overall model $M_W$ is generated based on a plurality of partial models $m_k$. As such, it is possible to accurately estimate not only a simple shape like a cuboid, but also a space having a complicated shape. Further, the overall model $M_W$ is generated not from a single photographed image I, but from a plurality of images $I_k$, and thus, even though conventional techniques are employed to generate each partial model $m_k$, it is possible to estimate a space having a complicated shape. As a result, the overall model $M_W$ can be generated using simple processing, which helps to reduce the processing load on the computer.

The overall model $M_W$ is generated by positioning the overlapped portions of the partial models $m_k$, which helps to closely dispose the partial models $m_k$. As such, it is possible to increase the accuracy of the overall model $M_W$.

The positions and orientations of the partial models $m_k$ are determined based on the image information about the capturing directions of the images $I_k$, and thus the partial models $m_k$ can be disposed so as to correspond to the arrangement and orientation of the walls W in the real space. As such, it is possible to increase the accuracy of the overall model $M_W$. Further, a user needs not to specify the positions and orientations of the partial models $m_k$, which helps to reduce encumbrances on the user and to quickly generate the overall model $M_W$.

The positions and orientations of the partial models $m_k$ are determined based on positions of the respective images $I_k$ in a single photographed image I, and thus it is possible to more easily determine the positions and orientations of the partial model $m_k$. As a result, it is not necessary to execute the complicated processing, and thus the overall model $M_W$ can be quickly generated and the processing load on the 3D model generating device 10 can be reduced.

The overall model $M_W$ is generated based on a single photographed image I capturing 360 degrees horizontally, and thus it is possible to acquire the photographed image I in a single shot and labor of photographing when generating the overall model $M_W$ can be reduced.

The images $I_k$ capture different directions in the real space, and thus, even if the walls W cover a wide range, it is possible to generate the overall model $M_W$ that reproduces the shape of the walls W.

The overall model $M_W$ is generated by combining the partial models $m_k$ representing the parts of the room S, and thus it is possible to generate a 3D model to reproduce the shape of the room S even if the whole room S has a complicated shape.

Even when the walls W of the room S have a complicated shape with six or more walls W substantially orthogonal to one another, since the overall model $M_W$ is generated by combining the partial models $m_k$, it is possible to generate the overall model $M_W$ that reproduces the room S having a complicated shape with a lot of walls W.

2. Embodiment 2

Next, another embodiment of the 3D model generating system 1 will be described. The embodiment 2 described below may have the same hardware configuration of the 3D model generating system 1 as that of the embodiment 1.

[2-1. Overview of Embodiment 2]

The room S has various sizes even though the shapes are the same, and there is no particular standard size. As such, when the overall model $M_W$ is generated as described in the embodiment 1, sometimes the size of the room S is not reproduced. In this regard, objects O, such as a bed, have small individual differences in sizes, and their sizes are fixed in general. That is, each object O generally has a standard size, and the embodiment 2 utilizes this fact to estimate the real size of the room S and adjust the size of the overall model $M_W$.

In the embodiment 2, the overall model $M_W$ is set with a size parameter $\lambda$. The size of the overall model $M_W$ can be changed by the size parameter $\lambda$. The size parameter $\lambda$ may indicate a magnification or a reduction from the standard size, or at least one of a length, a width, and a height.

Figure 11:
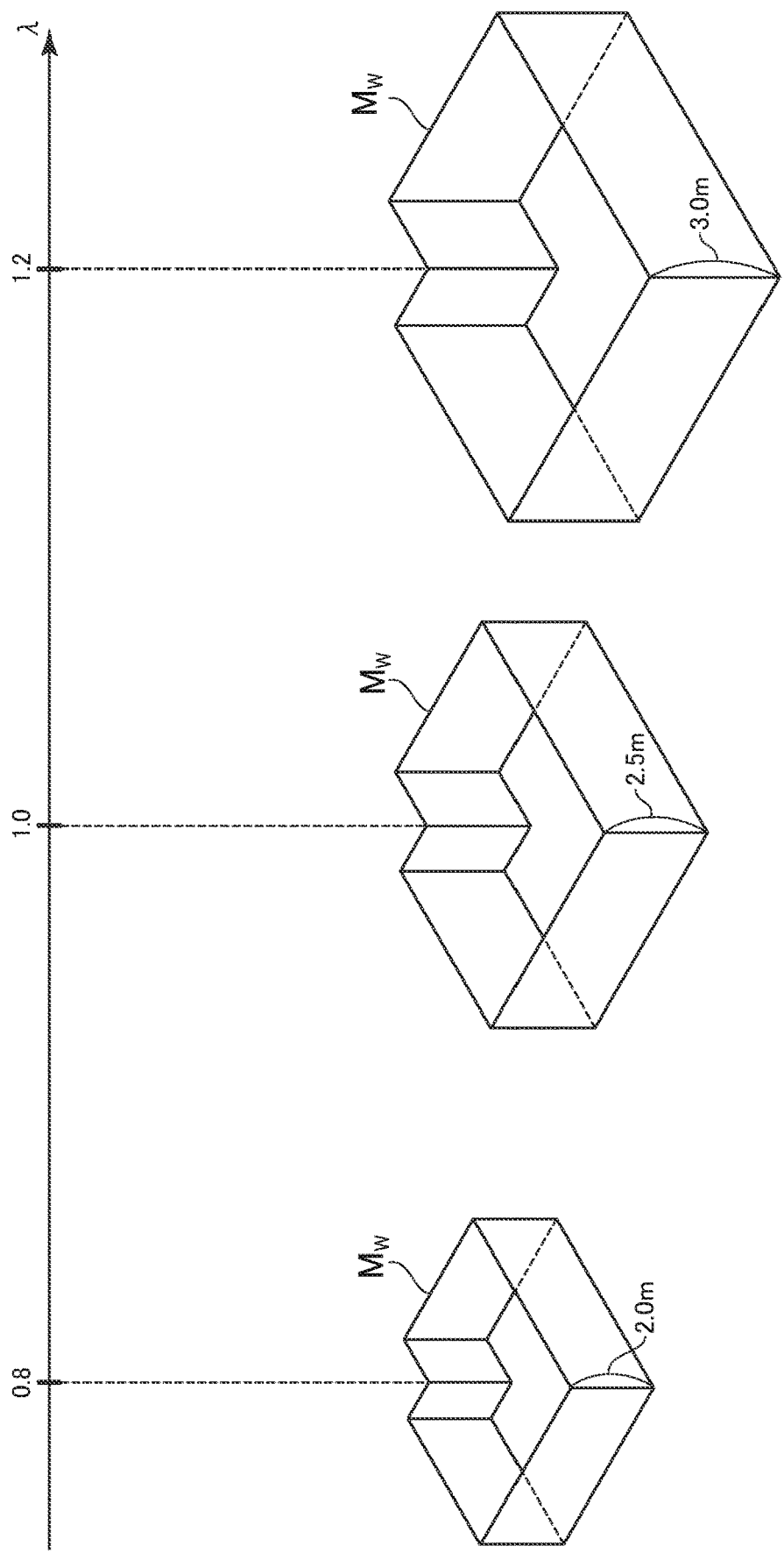
FIG. 11 is a diagram illustrating a relationship between a size parameter and an overall model.

FIG. 11 is a diagram illustrating a relationship between the size parameter $\lambda$ and the overall model $M_W$. The relationship between the size parameter $\lambda$ and the size of the overall model $M_W$ may be defined by numerical expressions described in a program. As shown in FIG. 11, the overall model $M_W$ has the size associated with the size parameter $\lambda$. For example, when the size parameter $\lambda$ is smaller, the overall model $M_W$ is smaller, and when the size parameter $\lambda$ is greater, the overall model $M_W$ is greater. At the time when the overall model $M_W$ is generated, the size parameter $\lambda$ may have an initial value (e.g., 1.0).

In the example shown in FIG. 11, the size parameter $\lambda$ indicates the height of the overall model $M_W$. For example, if the standard height is L when $\lambda=1$, the height of the overall model $M_W$ is $\lambda*L$. For example, if L=2.5 m, the height of the overall model $M_W$ is 2.0 m when $\lambda=0.8$, and 2.5 m when $\lambda=1.2$.

In this embodiment, the case is explained in which the size is changed while all the ratios in the horizontal direction (length and width) and the vertical direction (height) are maintained, although the size may be changed while only the ratio in the horizontal direction is maintained. When only the ration in the horizontal direction is maintained, the height of the overall model $M_W$ may be a fixed value, or changed within a predetermined range. In other words, the overall model $M_W$ may keep at least the shape viewed from above.

In the embodiment 2, object models representing objects O are disposed on the overall model $M_W$, which can be changed in size as described above. In the following, an object model is provided with a reference numeral of $M_{oj}$. The object model $M_{oj}$ is not generated from the image $I_k$ like the overall model $M_W$, but a 3D model prepared in advance. The object model $M_{oj}$ is registered in an object model database.

As described above, objects O have small individual differences in sizes, and an object model $M_{oj}$ has a general size of an object O (e.g., if an object O is a bed, size of a double bed). As such, if the size parameter $\lambda$ is adjusted so that the relative sizes of the overall model $M_W$ and the object model $M_{oj}$ in the virtual space are similar to the relative sizes of the wall W and the object O in the photographed image I, it is possible to make the overall model $M_W$ look like the size of the actual room S.

In the embodiment 2, the position and orientation of the object model $M_{oj}$ are adjusted in the virtual space so as to be similar to the position and the orientation of the object O in the room S. In the following, the parameter indicating the position is provided with the reference numeral of $p_j$, and the parameter indicating the orientation is provided with the reference numeral of $\theta_j$. The condition of the virtual space is determined based on the size parameter $\lambda$, the position parameter $p_j$, and the orientation parameter $\theta_j$, and thus these parameters will be collectively referred to as model parameters $\Phi$.

As described above, in the embodiment 2, the model parameters $\Phi$ are adjusted so as to reproduce the condition of the real room S. Here, reproducibility of the room S is evaluated using Bayesian inference. Bayesian inference is a method of statistical inference in which the probability of an event is estimated based on measurement results in the real world. When the probability by Bayesian inference is higher, the likelihood that the event to be estimated occurs in practice is higher. That is, when the probability by Bayesian inference is higher, the estimated virtual space is more similar to the actual room S.

The 3D model generating system 1 determines the model parameters $\Phi$ so as to increase the probability by Bayesian inference. In order to increase the probability, the embodiment 2 uses two evaluation values of an evaluation value $E_S$ indicating overall difference between the real space and the virtual space and an evaluation value $E_O$ indicating local difference between the real space and the virtual space, so that a virtual space having high reproducibility is efficiently generated. In the following, these techniques will be described in detail.

[2-2. Functions Implemented in Embodiment 2]

Figure 12:
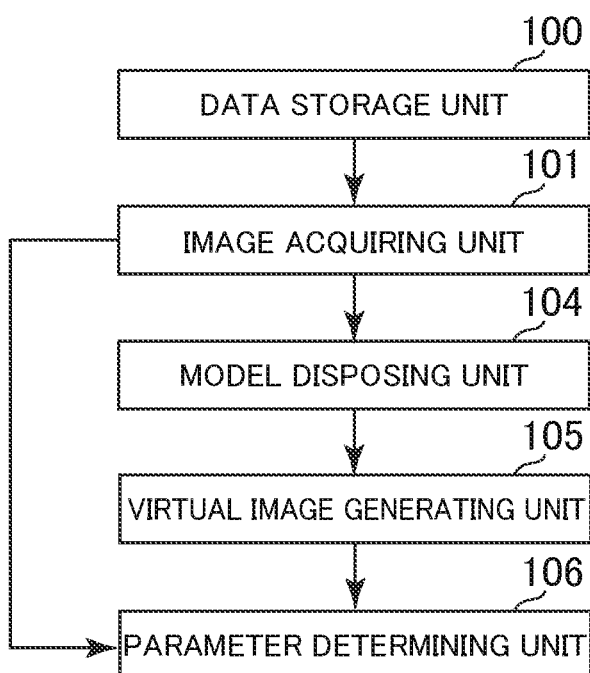
FIG. 12 is a functional block diagram showing an example of functions implemented in the 3D model generating system 1 of embodiment 2.

FIG. 12 is a functional block diagram showing an example of functions implemented in the 3D model generating system 1 of the embodiment 2. As shown in FIG. 12, in the embodiment 2, a case is explained in which a data storage unit 100, an image acquiring unit 101, a model disposing unit 104, a virtual image generating unit 105, and a parameter determining unit 106 are implemented by the 3D model generating device 10.

[2-2-1. Data Storage Unit]

The data storage unit 100 of the embodiment 2 stores the model parameters Φ and an object model database in addition to the data described in the embodiment 1. The values of the model parameters Φ are changed by the parameter determining unit 106. The position parameter $p_j$ may store 3D coordinates in the virtual space, and the orientation parameter $\theta_j$ may store a 3D vector, or be represented by a yaw angle, a pitch angle, and a roll angle.

FIG. 13 is a diagram illustrating an example of storing data in the object model database. As shown in FIG. 13, the object model database stores a category of an object O, an object model $M_{oj}$ indicating a 3D model of the object O in the category, and an orientation of the object O in association with one another. The object model database may include size information indicating actual sizes of object models $M_{oj}$.

The category is a type of an object O, and a name to classify a subject. The category may be something relatively large, such as furniture and home appliances, or something relatively small, such as a bed or a chair.

The object model $M_{oj}$ is a 3D model of an object O in a standard shape and a size. It is sufficient that the object model database includes data indicating the object model $M_{oj}$. For example, the object model database includes 3D coordinates of vertexes, color information, and texture information of the object model $M_{oj}$. The embodiment 2 describes the object model $M_{oj}$ shaped in three dimensions having a depth, although the object model $M_{oj}$ may be flat. If the object model $M_{oj}$ is flat, the object model $M_{oj}$ may be a polygon, or polygons connected in a flat form. In this case, a texture image of the object O is attached to the object model $M_{oj}$.

As shown in FIG. 13, the object model database stores the object models $M_{oj}$ in multiple orientations (postures) for each category. The orientations may be indicated in all of a yaw angle, a pitch angle, and a roll angle, although the orientations may be indicated in only a yaw angle and a pitch angle as shown in FIG. 13, because a roll angle of an object on a horizontal surface or on a vertical surface is fixed. In this regard, in a case where the object O is something on the horizontal surface, such as a bed, only a yaw angle may be indicated because a pitch angle is also fixed. In a case where the object O is something on the vertical surface, such as a wall clock, only a pitch angle may be indicated because a yaw angle is fixed.

In this embodiment, in order to simplify the processing to detect an object O from the photographed image I, the object model database stores a template image for each orientation of the object model $M_{oj}$. The template image indicates a standard shape of an object, and, for example, is an image showing the object model $M_{oj}$ viewed from a direction in which the object model $M_{oj}$ is oriented. The template image may be stored in another database, or generated from the object model $M_{oj}$.

[2-2-2. Image Acquiring Unit]

The image acquiring unit 101 may be the same as described in the embodiment 1, and acquires the photographed image I in which a first object and a second object each disposed in the real space are captured.

The first object is an object having a known size, and its 3D model is stored in the object database. In other words, the first object is an object based on which a size of the second object is estimated. In this embodiment, the objects O other than the walls W correspond to the first object. That is, a case is explained in which the first object is, for example, furniture disposed in the room S. As such, the object model $M_{oj}$ corresponds to an example of a first model representing a first object.

The second object is an object having an unknown size, and its size is to be estimated. In this embodiment, the walls W of the room S correspond to the second object. As such, the overall model $M_W$ corresponds to an example of a second model representing the second object.

[2-2-3. Model Disposing Unit]

The model disposing unit 104 is implemented mainly by the control unit 11. The model disposing unit 104 disposes the object models $M_{oj}$ and the overall model $M_W$ in the virtual space. The overall model $M_W$ may be generated in the same way as described in the embodiment 1, or in the different way from the embodiment 1. For example, a user may use a CAD system to depict the overall model $M_W$ of unknown size in advance. The initial values of the model parameter λ may be any predetermined value, and here, λ=1.

For example, the model disposing unit 104 disposes, in the virtual space, the object O oriented in the direction determined based on the photographed image I. In this embodiment, since template images are registered in the object model database, the model disposing unit 104 disposes, in the virtual space, the object model $M_{oj}$ oriented in the direction determined based on a result of comparing the photographed image I with the template image indicating the object O oriented in the predetermined direction. At this point, the model parameters Φ have initial values. That is, the model disposing unit 104 detects an object O captured in the photographed image I, and disposes an object model $M_{oj}$ representing the detected object O at an initial position and in an initial orientation on the overall model $M_W$ in an initial size.

More specifically, the model disposing unit 104 detects an object O in the photographed image I based on an object detection algorithm. Various known techniques may be applicable to the object detection algorithm, and for example, a template matching method based on the template images or a degree of similarity between feature quantities indicating shape features of objects may be used.

Here, a template matching method will be described as an example of the object detection algorithm. For example, the model disposing unit 104 calculates a similarity between any area in the photographed image I and a template image. The similarity suggests a degree of similarity between an outline of a subject in the area and an outline of an object indicated by the template image. The outline of the subject may be detected by edge detection processing. The model disposing unit 104 determines that the object indicated by the template image is captured in the area having the similarity equal to or greater than a threshold value.

The model disposing unit 104 determines initial values of the position parameter $p_j$ and the orientation parameter $\theta_j$ of the object model $M_{oj}$ based on the detection result of the object detection algorithm.

For example, the model disposing unit 104 determines an initial value of a position parameter $p_j$ of an object model $M_{oj}$ indicating an object O based on the position at which the object O is captured in the photographed image I. The model disposing unit 104 converts 2D coordinates of the position at which the object O is captured into 3D coordinates, and sets the 3D coordinates as an initial value of the position parameter $p_j$. In other words, the model disposing unit 104 determines the initial value of the position parameter $p_j$ so that the positional relationship between the camera 20 and the object O corresponds to the positional relationship between the virtual camera VP and the object model $M_{oj}$. "Correspond" means that a vector connecting the camera 20 and the object O is the same as a vector connecting the virtual camera VP and the object model $M_{oj}$, or a difference between these vectors is less than a threshold value.

For example, the model disposing unit 104 determines an initial value of an orientation parameter $\theta_j$ based on an orientation associated with the template image. In this embodiment, the template images oriented in a plurality of directions are prepared, and thus the model disposing unit 104 acquires an orientation associated with the template image having the similarity equal or greater than the threshold value with an area in the photographed image I.

As described above, in the virtual space, the model disposing unit 104 disposes the overall model $M_{oj}$ of the size indicated by the initial value model parameter $\lambda$, and disposes, on the overall model $M_W$, the object model $M_{oj}$ oriented in the initial direction indicated by the initial value orientation parameter $\theta_j$ at the initial position indicated by the initial value position parameter $p_j$.

Figure 14:
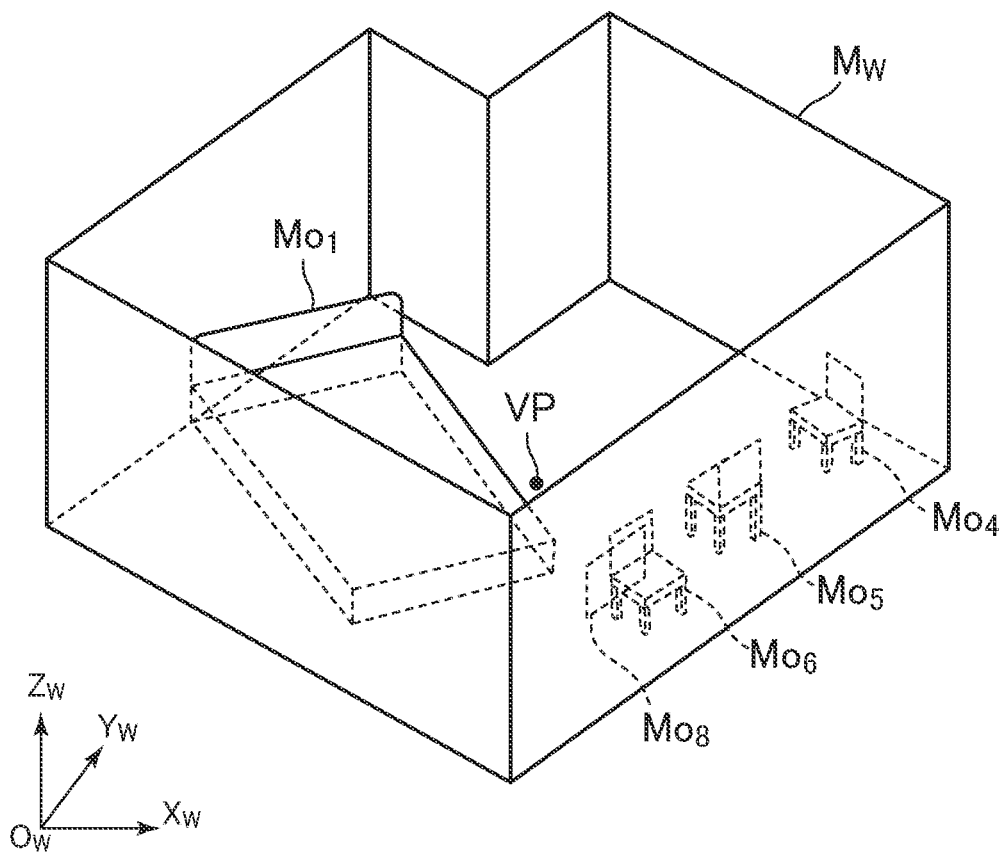
FIG. 14 is a diagram illustrating an example of a virtual space in which an overall model and object models are disposed.

FIG. 14 is a diagram illustrating an example of a virtual space in which the overall model $M_W$ and object models $M_{oj}$ are disposed. Here, a case is explained in which objects $o_1$, $O_4$, $o_5$, $o_6$, and $o_8$ are detected from the photographed image I, and objects $o_2$, $o_3$, and $o_7$ are not detected. In this manner, all the objects O are not necessarily to be detected in the room S, but the object models $M_{oj}$ may be disposed in the detected range. As shown in FIG. 14, the model disposing unit 104 disposes object models $Mo_1$, $Mo_4$, $Mo_5$, $Mo_6$, and $Mo_8$ on a floor surface of the overall model $M_W$. That is, in this embodiment, a plurality of objects O are captured in the photographed image I, and thus a plurality of object models $M_{oj}$ respectively corresponding to the objects O are disposed in the virtual space.

In practice, the object O is similar to, but not the same as the shape of the object indicated by the template image, and thus positions and orientations of the object models $M_{oj}$ may be roughly matched, but not be precisely matched. In addition, the size parameter $\lambda$ is not adjusted yet, the overall model $M_W$ may be larger or smaller than the object models $M_{oj}$. As such, the parameter determining unit 106 described later adjusts the model parameters $\Phi$.

[2-2-4. Virtual Image Generating Unit]

The virtual image generating unit 105 is implemented mainly by the control unit 11. The virtual image generating unit 105 generates a virtual image in which an object model $M_{oj}$ representing an object O of a standard size and an overall model $M_W$ representing walls W of a size that is not standard are disposed in a virtual space. As stated above, the walls W have large individual differences in sizes, and have no particular standard size. As such, there is a possibility that, when the overall model $M_W$ is generated, the size of the overall model $M_W$ does not match that of the actual walls W. The virtual image generating unit 105 performs a coordinate conversion on vertexes of the overall model $M_W$ and the object models $M_{oj}$ in the virtual space using a predetermined determinant, thereby generating a virtual image. Various known techniques may be applicable to a method for presenting a 3D model disposed in the virtual space as a 2D image.

Figure 15:
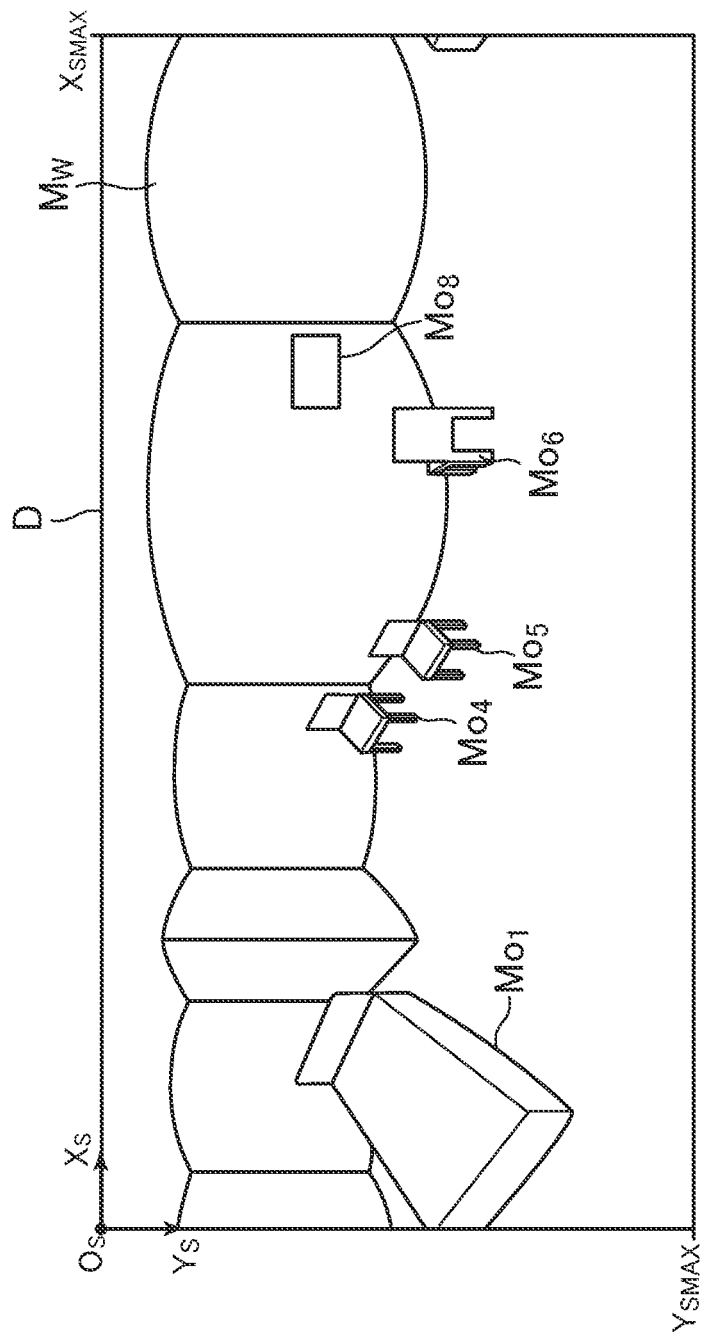
FIG. 15 is a diagram illustrating an example of a virtual image.

FIG. 15 is a diagram illustrating an example of the virtual image. As shown in FIG. 15, the virtual image generating unit 105 generates a virtual image D showing a virtual space viewed from a virtual camera. Similarly to the photographed image I, here, the upper left vertex of the virtual image D is set as the origin $O_S$, and the $X_S$-axis and the Ys-axis are determined. In the photographed image I shown in FIG. 15, the walls W are partially hidden by the objects O, and thus the overall model $M_W$ is partially hidden by the object models $M_{oj}$ in the virtual image D. In other words, in the photographed image I, the walls W are captured behind the objects O, and thus in the virtual image D, the overall model $M_W$ is depicted behind the object models $O_w$.

The aspect ratio, size, and resolution of the virtual image D are the same as the aspect ratio, size, and resolution of the photographed image I. As such, the maximum value of the $X_S$ coordinate values in the virtual image D is $X_{SMAX}$, which is the same value as that of the photographed image I, and the maximum value of the $Y_S$ coordinate values in the virtual image D is $Y_{SMAX}$, which is the same value as that of the photographed image I. The field angle of the virtual camera may be determined to be consistent with the field angle of the camera 20. In this embodiment, the field angles of the camera 20 are 360 degrees in the horizontal direction and 180 degrees in the vertical direction, and thus the virtual camera may have the same field angles. As such, the virtual image generating unit 105 generates the virtual image D in which all the directions in the horizontal direction are depicted in the virtual space similarly to the photographed image I.

[2-2-5. Parameter Determining Unit]

The parameter determining unit 106 is implemented mainly by the control unit 11. The parameter determining unit 106 determines the model parameters $\Phi$. That is, the parameter determining unit 106 changes at least one of the initial values of the size parameter $\lambda$, the position parameter $p_j$, and the orientation parameter $\theta j$.

For example, if the parameter determining unit 106 changes the size parameter $\lambda$, the vertex coordinates of the overall model $M_W$ are changed to the size indicated by the changed size parameter $\lambda$. Further, for example, if the parameter determining unit 106 changes the position parameter $p_j$, the object model $M_{oj}$ moves to the position indicated by the changed position parameter $p_j$. Further, for example, if the parameter determining unit 106 changes the orientation parameter $\theta_j$, the orientation of the object model $M_{oj}$ is changed to the orientation indicated by the changed orientation parameter $\theta_j$.

The parameter determining unit 106 may determine the model parameters $\Phi$ based on the photographed image I and the virtual image D. Here, as an example, layout estimation processing for roughly determining the model parameters $\Phi$ using the evaluation value $E_S$ and detailed determination processing for determining the model parameters $\Phi$ in detail using the evaluation value $E_O$ will be described.

[Layout Estimation Processing]

The layout estimation processing will be discussed. In the layout estimation processing, the model parameters $\Phi$ are determined so that the orientation map of the virtual image D is similar to the orientation map of the photographed image I. Here, a case is explained in which the size parameter $\lambda$ and the position parameter $p_j$ of the model parameters $\Phi$ are determined in the layout estimation processing. As such, in the layout estimation processing, the initial value may be used for the orientation parameter $\theta_j$.

The parameter determining unit 106 generates orientation maps of the photographed image I and the virtual image D, respectively. The method for generating the orientation map is the same as the method described in the embodiment 1, and the orientation map may be generated based on the positional relationship between segments indicating an outline of an object. In this embodiment, the parameter determining unit 106 masks a part capturing the object O in the orientation map of the photographed image I, and masks a part depicting the object model $M_{oj}$ in the orientation map of the virtual image D. In other words, the parameter determining unit 106 uses a part of the wall W, which is not hidden by the object O in the orientation map of the photographed image I, as a comparison subject, and uses a part of the overall model $M_W$, which is not hidden by the object model $M_{oj}$ in the orientation map of the virtual image D, as a comparison subject.

FIG. 16 is a diagram illustrating the orientation map of the photographed image I with the objects O being masked, and FIG. 17 is a diagram illustrating the orientation map of the virtual image D with the object models $M_{oj}$ being masked. The parameter determining unit 106 calculates an evaluation value $E_S$ using the following equation 1 based on the orientation map of the photographed image I shown in FIG. 16 and the orientation map of the virtual image D shown in FIG. 17.

$$E_S = 1 - N_c/N_{pix} \quad (1)$$

$N_{pix}$ in the equation 1 is the total number of pixels in the photographed image I and the virtual image D. As such, $N_{pix} = X_{SMAX} * Y_{SMAX}$. $N_c$ in the equation 1 is the number of pixels having matched directions of the orientation maps between the photographed image I and the virtual image D. Specifically, $N_c$ is calculated using the following equation 2.

$$N_c = \sum_{m \in I} 1_{l(I_m) = l(D_m)}(m) \quad (2)$$

In the equation 2, m means any pixel, and l(Idm) means a direction of a pixel m indicated by the orientation map of the photographed image I. $l(D_m)$ in the equation 2 means a direction of the pixel m indicated by the orientation map of the virtual image D. As such, the right side of the equation 2 means the total number of pixels having matched directions between the directions indicated by the orientation map of the photographed image I and the directions indicated by the orientation map of the virtual image D.

As shown in the equation 1, the evaluation value $E_S$ indicates coincidence between the orientation map of the photographed image I and the orientation map of the virtual image D. Here, a low evaluation value $E_S$ suggests that directional coincidence is high, and a high evaluation value $E_S$ suggests that directional coincidence is low. The coincidence between the orientation maps depends on the size of the overall model $M_W$ and the positions of the object models $M_{oj}$. As such, the parameter determining unit 106 adjusts the size parameter λ and the position parameter $p_j$ so that the evaluation value $E_S$ is low.

For example, when the size parameter λ is too small, a part of the overall model $M_W$ hidden by the object models $M_{oj}$ is greater than the actual hidden part. In this case, when the size parameter λ is increased, the coincidence is increased and the evaluation value $E_S$ is reduced. For example, when the size parameter λ is too large, a part of the overall model $M_W$ hidden by the object models $M_{oj}$ is less than the actual hidden part. In this case, when the size parameter λ is reduced, the coincidence is increased and the evaluation value $E_S$ is reduced. For example, if relative positional relationship between the overall model $M_W$ and the object models $M_{oj}$ is different from the actual relationship, the number of pixels having matched directions is reduced. In this case, if the position parameter pi is changed so that the positions of the object models $M_{oj}$ are closer to the actual positions of the objects O, the coincidence is increased and the evaluation value $E_S$ is reduced.

The parameter determining unit 106 adjusts the size parameter λ and the position parameter $p_j$ until the evaluation value $E_S$ is less than the threshold value. For example, the parameter determining unit 106 selects a candidate value of the size parameter λ and a candidate value of the position parameter $p_j$ based on the initial value of the size parameter λ and the initial value of the position parameter $p_j$. The candidate value may be any value that differs from the initial value by less than the threshold value, and a plurality of candidate values may be selected.

The parameter determining unit 106 generates a virtual image D and calculates an evaluation value $E_S$ for each combination of a candidate value of the size parameter λ and a candidate value of the position parameter $p_j$. The parameter determining unit 106 specifies the combination of candidate values having the smallest evaluation value $E_S$ or the evaluation value $E_S$ less than the threshold value among from the combinations of candidate values. The parameter determining unit 106 updates the size parameter λ and the position parameter $p_j$ based on the specified candidate values. In this embodiment, the size parameter λ and the position parameter $p_j$ are roughly adjusted by the above described layout estimation processing.

[Detailed Determination Processing]

Next, the detailed determination processing will be described. In the real space, the object O is not usually disposed on a random basis, but on a predetermined rule. For example, in the room S as in this embodiment, the object O such as furniture is disposed based on a predetermined rule so as to be comfortably used by people. For example, a bed and a chair are often disposed in parallel to the wall, and the objects O are disposed so as not to overlap with each other.

With the above-described point considered, the model parameters Φ are adjusted in the detailed determination processing so that the relative relationship between the walls W and the objects O in the real space is similar to the relative relationship between the overall model $M_W$ and the object models $M_{oj}$ in the virtual space. Here, a case is explained in which all of the size parameter λ, the position parameter $p_j$, and the orientation parameter $\theta_j$ of the model parameters Φ are determined in the detailed determination processing.

There are two types of evaluation values $E_O$: evaluation value $E_{o,\omega}$ for evaluating relative relationship between an overall model $M_W$ and an object model $M_{oj}$; and evaluation value $E_{o,o}$ for evaluating relative relationship between object models $M_{oj}$. Here, in order to simplify the processing, the evaluation values $E_{o,\omega}$ and $E_{o,o}$ are evaluated by using shapes of the object models $M_{oj}$ projected on the floor surface of the overall model $M_W$.

Figure 18:
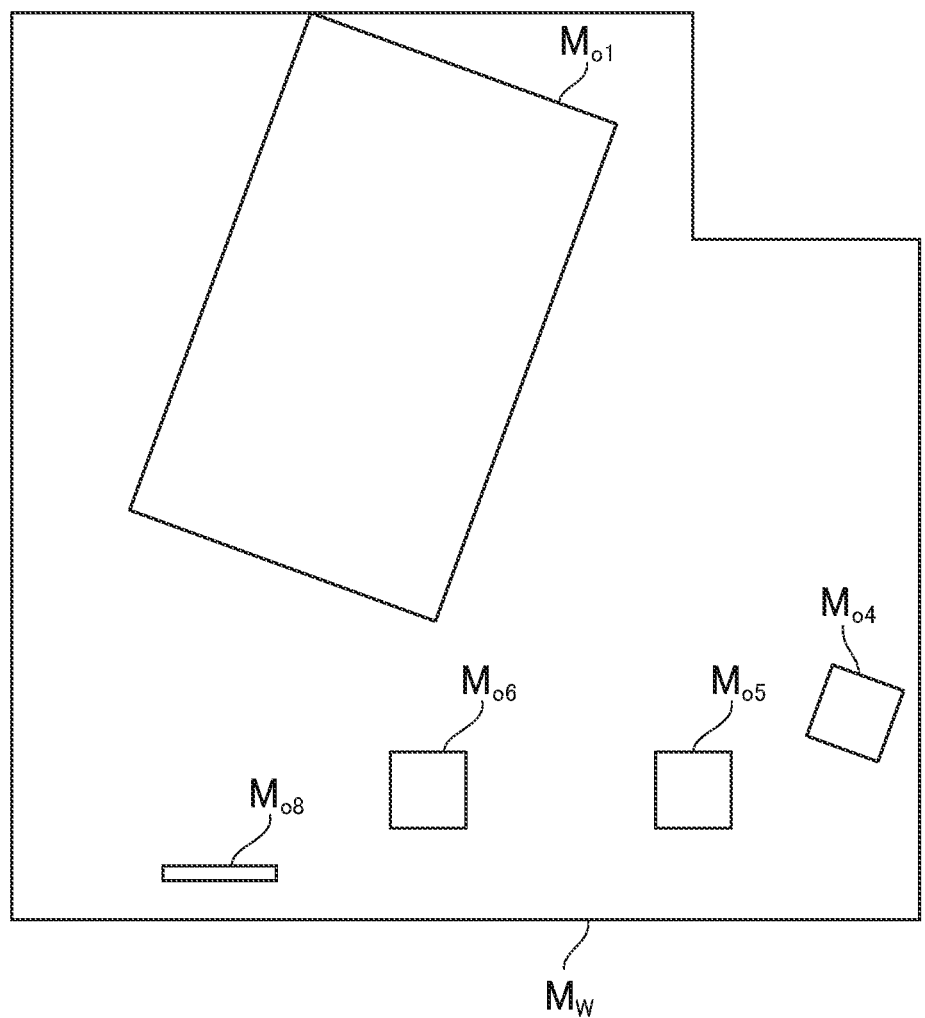
FIG. 18 is a diagram illustrating a virtual space viewed from above.

FIG. 18 is a diagram illustrating the virtual space viewed from above. As shown in FIG. 18, the parameter determining unit 106 orthogonally projects the object models $M_{oj}$ on the floor surface of the overall model $M_W$ from an upper direction. Subsequently, the parameter determining unit 106 calculates the evaluation value $E_{o,\omega}$ using the following equation 3.

$$E_{o,\omega}(\Phi) = \sum_{j=1}^{N_0} \|p(o_j) - p(\omega_{i*(j)})\| + v_n \sum_{j=1}^{N_0} \|n(o_j)^T n(\omega_{i*(j)})\| \quad (3)$$

In the equation 3, $p(o_j)$ means a position of an object model $M_{oj}$ in the orthogonal projection. $p(\omega_i*_{(j)})$ is a position of a wall closest to the object model $M_{oj}$ in the overall model $M_W$. As such, the first term of the right-hand side of the equation 3 indicates a distance between the overall model $M_W$ and the object model $M_{oj}$ in the virtual space. When this distance is shorter, the evaluation value $E_{o,\omega}(\Phi)$ is smaller. In other words, when the object model $M_{oj}$ is closer to the overall model $M_W$, the reproducibility of the room S is increased.

In the equation 3, $v_n$ is a weighting coefficient. The weighting coefficient may be any value, for example, about 0.5. $n(o_j)$ is a direction of an object model $M_{oj}$. $n(\omega_{i*(j)})$ is a direction of a wall closest to the object model $M_{oj}$ in the overall model $M_W$. As such, the second term of the right-hand side of the equation 3 indicates a directional difference between the overall model $M_W$ and the object model $M_{oj}$ in the virtual space. When the directional difference is smaller, the evaluation value $E_{o,\omega}(\Phi)$ is smaller. In other words, when the object model $M_{oj}$ is oriented in the same direction as the near overall model $M_W$, the reproducibility is increased.

The parameter determining unit 106 calculates an evaluation value $E_{o,o}$ using the following equation 4.

$$E_{o,o}(\Phi) = \sum_{j,k=1}^{N_0} A(b(o_j) \cap b(o_k)) \quad (4)$$

In the equation 4, A indicates how an area b ($o_j$), in which an object model $M_{oj}$ is orthogonally projected on the floor surface of the overall model $M_W$, overlaps an area b (ok), in which any one of other object models $M_{oj}$ is orthogonally projected on the floor surface of the overall model $M_W$. As such, the right-hand side of the equation 4 is higher when the overlapped portion of the object models $M_{oj}$ is larger, and is smaller when the overlapped portion of the object models $M_{oj}$ is smaller. In other words, when the object model $M_{oj}$ is not overlapped with the nearby object model $M_{oj}$, the reproducibility is increased.

The parameter determining unit 106 determines the model parameters $\Phi$ based on the evaluation value $E_{o,\omega}$ and the evaluation value $E_{o,o}$. For example, the parameter determining unit 106 determines the model parameters $\Phi$ so that both of the evaluation value $E_{o,\omega}$, and the evaluation value $E_{o,o}$ are less than the threshold value.

For example, similarly to the layout estimation processing, the parameter determining unit 106 selects a candidate value of the size parameter $\lambda$, a candidate value of the position parameter $p_j$, and a candidate value of the orientation parameter $\theta_j$. The parameter determining unit 106 specifies a combination of candidate values having the smallest values of the evaluation value $E_{o,\omega}$ and the evaluation value $E_{o,o}$ among these candidate values. The parameter determining unit 106 updates the size parameter $\lambda$, the position parameter $p_j$, and the orientation parameter $\theta_j$ based on the specified candidate values.

Figure 19:
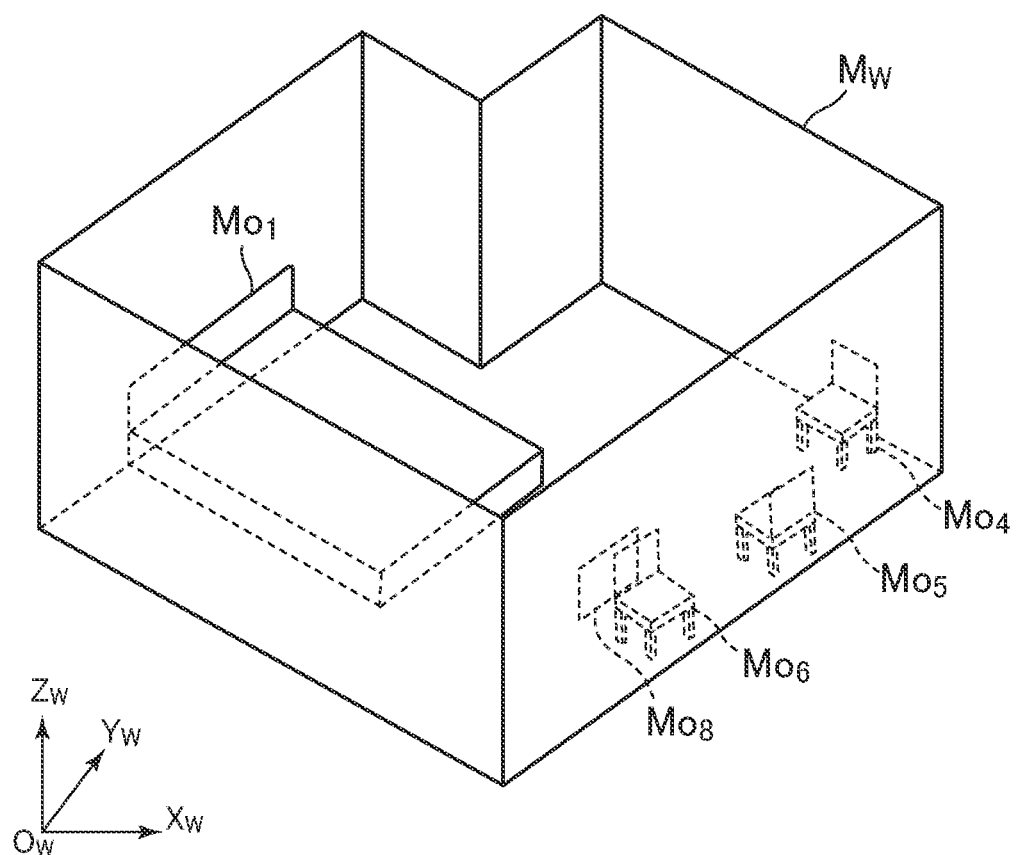
FIG. 19 is a diagram illustrating the virtual space when model parameters are adjusted.

FIGS. 19 and 20 are diagrams illustrating the virtual space when the model parameters $\Phi$ are adjusted. As shown in FIG. 19, when the model parameters $\Phi$ are adjusted, the condition of the virtual space approaches the condition of the real space. For example, as shown in FIG. 20, when the overall model $M_W$ is too small relative to the object models $M_{oj}$, the size parameter $\lambda$ is increased to reduce the evaluation value $E_S$ and the evaluation value $E_o$, and the overall model $M_W$ thereby approaches the size of the real room S. That is, the size parameter $\lambda$ is determined so that the relative relationship between the size of the overall model $M_W$ and the sizes of the object models $M_{oj}$ is similar to the relative relationship between the size of the room S and the sizes of the objects O.

When the object models $M_{oj}$ are away from the overall model $M_W$ or not in parallel with the wall, or when the object models $M_{oj}$ overlap with each other, the evaluation value EO becomes large. In this regard, the arrangement of the objects O in the actual room S can be nearly obtained by changing the position parameter $p_j$ so as to move the object models $M_{oj}$ closer to the overall model $M_W$, changing the orientation parameter $\theta_j$ so as to dispose the object models $M_{oj}$ in parallel with the overall model $M_W$, or adjusting the position parameter $p_j$ and the orientation parameter $\theta_j$ so as to prevent the object models $M_{oj}$ from being overlapping with each other. That is, the position parameter $p_j$ and the orientation parameter $\theta_j$ are determined so that the relative positions and orientations of the overall model $M_W$ and the object models $M_{oj}$ are similar to the relative positions and orientations of the room S and the objects O.

As described above, the parameter determining unit 106 determines the size parameter $\lambda$ indicating the size of the overall model $M_W$ based on the result of comparing the photographed image I with the virtual image D. For example, a size determining unit 105 determines the size parameter $\lambda$ based on the result of comparing pixels presenting the walls W in the photographed image I with pixels depicting the overall model $M_W$ in the virtual image D. For example, the parameter determining unit 106 determines the size parameter $\lambda$ so that the coincidence between the pixels presenting the walls W in the photographed image I and the pixels depicting the overall model $M_W$ in the virtual image D is equal to or more than the threshold value. Here, the coincidence may be the coincidence of the orientation maps as described above, or the coincidence of the sizes in the images.

The parameter determining unit 106 may determine the size parameter $\lambda$ based on the result of comparing the pixels presenting the objects O in the photographed image I with the pixels depicting the object models $M_{oj}$ in the virtual image D. In this case, the parameter determining unit 106 determines the size parameter $\lambda$ so that the coincidence between the pixels presenting the objects O in the photographed image I and the pixels depicting the object models $M_{oj}$ in the virtual image D is equal to or more than the threshold value.

The parameter determining unit 106 determines the size parameter $\lambda$ based on the result of comparing a part of the walls W other than the part hidden by the objects O (i.e., a part of the walls W, which is not hidden by the objects O and captured in the photographed image I) with a part of the overall model $M_W$ other than the part hidden by the object models $M_{oj}$ (i.e., an area of the overall model $M_W$, which is not hidden by the object models $M_{oj}$ and depicted in the virtual image D). That is, when determining the size parameter $\lambda$, the parameter determining unit 106 excludes the area of the photographed image I in which the object O is captured and the area of the virtual image D in which the object model $M_{oj}$ is depicted from comparison target.

The parameter determining unit 106 determines the position parameter $p_j$ indicating positions of the object models $M_{oj}$ based on the result of comparing the photographed image I with the virtual image D. For example, the parameter determining unit 106 determines the position parameter $p_j$ based on the result of comparing the pixels presenting the objects O in the photographed image I with the pixels depicting the object models $M_{oj}$ in the virtual image D.

The parameter determining unit 106 determines the size parameter λ based on the result of comparing orientations of the objects (here, the walls W and the objects O) captured in the pixels of the photographed image I with orientations of the models (here, the overall model $M_W$ and the object models $M_{oj}$) depicted in the pixels of the virtual image D. That is, the parameter determining unit 106 determines the size parameter λ so that the coincidence of these orientations is equal to or more than the threshold value.

The case has been explained in which the size parameter λ and the position parameter $p_j$ are determined based on the evaluation value $E_S$, although the orientation parameter $θ_j$ may be determined based on the evaluation value $E_S$. That is, the parameter determining unit 106 may determine the orientation parameter $θ_j$ indicating orientations of the object models $M_{oj}$ based on the result of comparing the photographed image I with the virtual image D. For example, the parameter determining unit 106 determines the orientation parameter $θ_j$ based on the result of comparing the pixels presenting the objects O in the photographed image I with the pixels depicting the object models $M_{oj}$ in the virtual image D.

The parameter determining unit 106 determines the size parameter λ based on the relative relationship between the object models $M_{oj}$ and the overall model $M_W$ in the virtual space. That is, the parameter determining unit 106 determines the size parameter λ so that the coincidence between the relative relationship between the object models $M_{oj}$ and the overall model $M_W$ in the virtual space and the relative relationship between the objects O and the walls W in the real space is equal to or more than the threshold value.

The parameter determining unit 106 determines the position parameter $p_j$ indicating the positions of the object models $M_{oj}$ based on the relative relationship between the object models $M_{oj}$ and the overall model $M_W$ in the virtual space. That is, the parameter determining unit 106 determines the position parameter $p_j$ so that the coincidence between the relative relationship between the object models $M_{oj}$ and the overall model $M_W$ in the virtual space and the relative relationship between the objects O and the walls W in the real space is equal to or more than the threshold value. Here, the coincidence may be the coincidence of the orientation maps described above, or the coincidence of sizes in the images.

The parameter determining unit 106 determines the orientation parameter $θ_j$ indicating the orientations of the object models $M_{oj}$ based on the relative relationship between the object models $M_{oj}$ and the overall model $M_W$ in the virtual space. That is, the parameter determining unit 106 determines the orientation parameter $θ_j$ so that the coincidence between the relative relationship between the object models $M_{oj}$ and the overall model $M_W$ in the virtual space and the relative relationship between the objects O and the walls W in the real space is equal to or more than the threshold value. Here, the coincidence may be the coincidence of the orientation maps described above, or the coincidence of sizes in the images.

The parameter determining unit 106 determines the size parameter λ based on the relative relationship between the objects O in the virtual space. For example, the parameter determining unit 106 determines the size parameter λ so that the relative relationship between the objects O in the virtual space satisfies a predetermined relationship. The predetermined relationship is a relationship indicating that the object models $M_{oj}$ do not overlap with one another. When the size parameter λ is too small, there is no space to dispose the object models $M_{oj}$ and thus the object models $M_{oj}$ overlap with one another. As such, the size parameter λ having a large enough magnitude for preventing the object models $M_{oj}$ from overlapping with one another is determined.

The parameter determining unit 106 determines the position parameter $p_j$ indicating respective positions of the overall models $M_W$ based on the relative relationship between the overall models $M_W$ in the virtual space. For example, the parameter determining unit 106 determines the position parameter $p_j$ so that the relative relationship between the objects O in the virtual space satisfies a predetermined relationship. The predetermined relationship is a relationship indicating that the object models $M_{oj}$ do not overlap with one another, and the position parameter $p_j$ is determined so that the object models $M_{oj}$ are at positions or in orientations that the object models $M_{oj}$ do not overlap with one another.

The parameter determining unit 106 determines the orientation parameter $θ_j$ indicating respective orientations of the overall models $M_W$ based on the relative relationship between the overall models $M_W$ in the virtual space. For example, the parameter determining unit 106 determines the orientation parameter $θ_j$ so that the relative relationship between the objects O in the virtual space satisfies a predetermined relationship. The predetermined relationship is a relationship indicating that the object models $M_{oj}$ do not overlap with one another, and the orientation parameter $θ_j$ is determined so that the object models $M_{oj}$ are at positions or in orientations that the object models $M_{oj}$ do not overlap with one another.

[2-3. Processing Executed in this Embodiment]

Figure 21:
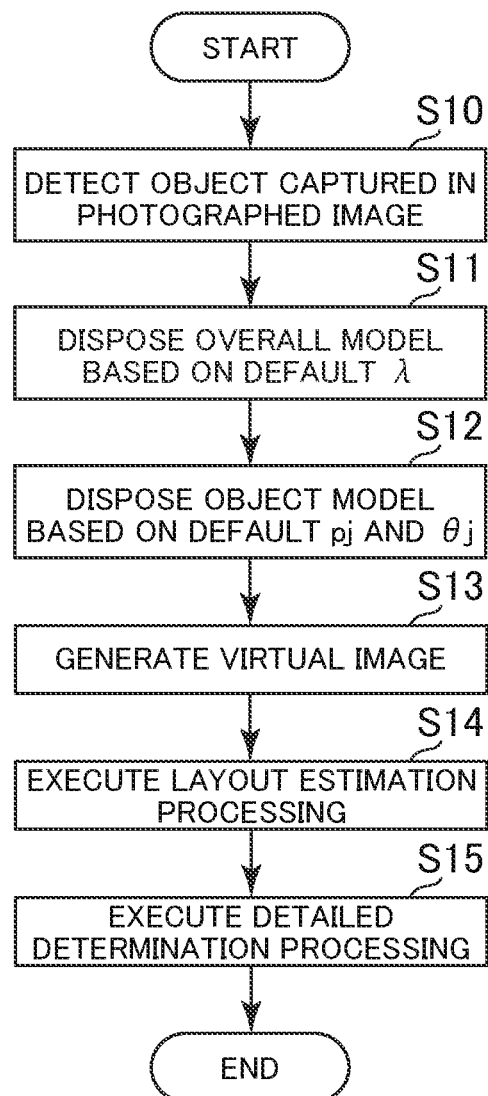
FIG. 21 is a flow chart showing an example of processing executed in the 3D model generating system.

FIG. 21 is a flow chart showing an example of the processing executed in the 3D model generating system 1. The processing shown in FIG. 21 is executed when the control unit 11 operates according to a program stored in the storage unit 12. The processing described below is an example of the processing executed by the functional block shown in FIG. 12. In a case where the overall model $M_W$ is generated in the same way as described in the embodiment 1, the processing shown in FIG. 21 may be executed after the processing shown in FIG. 10.

As shown in FIG. 21, the control unit 11 detects an object O captured in the photographed image I based on the object model database (S10). As described above, in S10, the control unit 11 detects whether there is an object O in the photographed image I using a template image by template matching.

The control unit 11 disposes an overall model $M_W$ in the virtual space based on the default size parameter λ (S11), and disposes an object model $M_{oj}$ of the object detected in S10 on the overall model $M_W$ based on the default position parameter $p_j$ and the default orientation parameter $θ_j$(S12). In S11, the control unit 11 disposes the overall model $M_W$ of a size indicated by the default size parameter λ in the virtual space, and disposes a virtual viewpoint VP based on the photographed image I. In S12, the control unit 11 converts 2D coordinates indicating positions of objects O captured in the photographed image I into 3D coordinates to obtain an initial value of the position parameter $p_j$, and sets the orientation associated with the template image as an initial value of the orientation parameter $θ_j$.

The control unit 11 generates a virtual image D indicating the virtual space viewed from the virtual camera VP (S13). The parameters of the virtual camera VP, such as a field angle, are stored in the storage unit 12 in advance to indicate values corresponding to the camera 20. In S13, the control unit 11 converts the 3D coordinates of vertexes of the overall model $M_W$ and the object models $M_{oj}$ into 2D coordinates, thereby generating the virtual image.

The control unit 11 executes the layout estimation processing based on the orientation map of the photographed image I and the orientation map of the virtual image D, and determines the size parameter λ and the position parameter $p_j$ (S14). In S14, the control unit 11 calculates the evaluation value $E_S$ based on the equations 1 and 2, and determines the size parameter λ and the position parameter $p_j$ to minimize the evaluation value $E_S$.

The control unit 11 executes the detailed determination processing based on the relative relationship in the virtual space, and determines the size parameter λ, the position parameter $p_j$, and the orientation parameter $θ_j$(S15). In S15, the control unit 11 calculates the evaluation value $E_o$ and determines the size parameter λ, the position parameter $p_j$, and the orientation parameter $θ_j$ to minimize the evaluation value $E_o$. The processing in S14 and S15 may be repeated until the evaluation values $E_S$ and $E_O$ are sufficiently small.

According to the 3D model generating system 1 of the embodiment 2, utilizing the fact the objects O have small individual differences in sizes, the size parameter λ is adjusted based on the relative relationship between the overall model $M_W$ and the object models $M_{oj}$. As such, the size parameter λ can be estimated with relatively simple processing, and the processing load on the computer can be reduced while reducing labor of photographing when the size of the room S is estimated.

The size parameter λ is estimated based on the result of comparing the photographed image I masking the objects O and the virtual image D masking the object models $M_{oj}$, and is adjusted upon eliminating an unreliable portion for estimating the real space.

In this manner, the accuracy of the size parameter λ can be increased. Further, unnecessary processing is not performed on the unreliable portion, and thus the processing load on the computer can be reduced.

The object models $M_{oj}$ oriented in the directions, which are determined based on the photographed image I, are disposed in the virtual space. In this manner, the accuracy of the orientations of the object models $M_{oj}$ disposed in the virtual space can be increased, and the reproducibility of the room S can be increased. For example, by roughly matching the initial orientations of the object models $M_{oj}$ to the orientations of the actual objects O, the subsequent adjustment of the size parameter λ and the position parameter $p_j$ can be simplified, and thus the processing load on the computer in the following processing can also be reduced.

The accuracy of the position parameter $p_j$ and the size parameter λ can be increased by estimating the position parameter $p_j$ and the size parameter λ with the use of the orientation map of the photographed image I and the orientation map of the virtual image D. As described above, the orientation parameter $θ_j$ may be estimated by using these orientation maps, and in such a case, the accuracy of the orientation parameter $θ_j$ can be increased.

Further, utilizing the fact that the objects O have small individual differences in sizes, the size parameter λ, the position parameter $p_j$, and the orientation parameter $θ_j$ are adjusted based on the relative relationship between the overall model $M_W$ and the object models $M_{oj}$. As such, these parameters can be estimated with relatively easy processing, and the processing load on the computer can be reduced while reducing labor of photographing when the size of the room S or the positions and orientations of the objects O are estimated.

Since the size parameter λ, the position parameter $p_j$, and the orientation parameter $θ_j$ are adjusted based on the evaluation value $E_{o,\omega}$, it is possible to reflect the empirical rule of the relationship between the walls W and the objects O in the real world. In this manner, the accuracy of the size parameter λ, the position parameter $p_j$, and the orientation parameter $θ_j$ can be increased.

Since the size parameter λ, the position parameter $p_j$, and the orientation parameter $θ_j$ are adjusted based on the evaluation value $E_{o,o}$, it is possible to reflect the empirical rule of the relationship between the objects O in the real world. In this manner, the accuracy of the size parameter λ, the position parameter $p_j$, and the orientation parameter $θ_j$ can be increased.

The object model $M_{oj}$ is shaped in three dimensions with a depth, and thus the virtual space with a high degree of reproducibility can be generated.

Since the size parameter λ is determined based on the objects O, which are the furniture disposed in the room S, the room S in the real world can be reproduced.

3. Variations

The present invention is not to be limited to the above described embodiments, and can be changed as appropriate without departing from the spirit of the invention.

[3-1. Variation Regarding Embodiment 1]

For example, the embodiment 1 describes the case in which an overall model $M_W$ of a room S is generated, although, when a plurality of rooms S are disposed on a floor, overall models $M_W$ may be generated for respective rooms S, and these overall models $M_W$ may be disposed to reproduce the entire floor in the virtual space.

Figure 22:
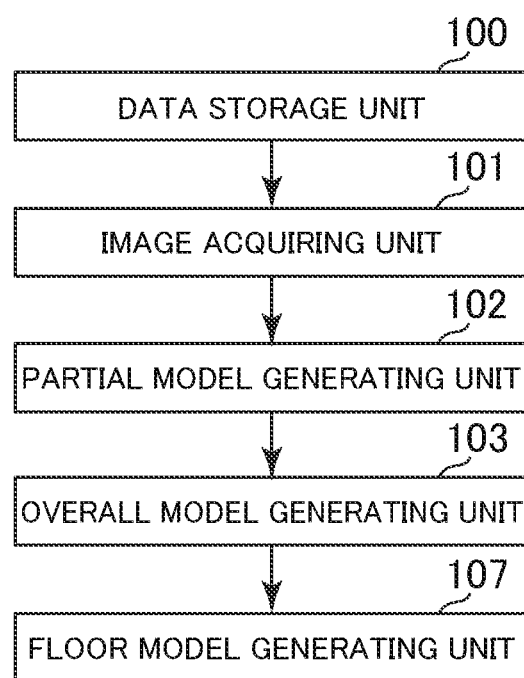
FIG. 22 is a functional block diagram of a variation of the embodiment 1.

FIG. 22 is a functional block diagram of a variation of the embodiment 1. As shown in FIG. 22, in this variation, a floor model generating unit is implemented in addition to the functions described in the embodiment 1. The floor model generating unit 107 is implemented mainly by the control unit 11.

The data storage unit 100 according to this variation stores photographed image data for each room S on a floor. That is, the data storage unit 100 stores photographed image data of each of a plurality of rooms S on the floor. Further, the data storage unit 100 may store data indicating arrangement of the rooms S on the floor. In other words, the data storage unit 100 may store data indicating positional relationship of the rooms S.

The image acquiring unit 101 acquires images $I_k$ respectively captured in the rooms S on the same floor. The method for acquiring the images $I_k$ may be the same as described in the embodiment 1. For example, the image acquiring unit 101 may split a photographed image I of a room S to acquire some images $I_k$.

The partial model generating unit 102 generates partial models $m_k$ corresponding to each room S. The overall model generating unit 103 generates an overall model $M_W$ corresponding to each room S. The method for generating the partial model $m_k$ and the overall model $M_W$ may be the same as described in the embodiment 1.

The floor model generating unit 107 generates a 3D model of the entire floor based on the overall models $M_W$ generated by the overall model generating unit 103. The floor model generating unit 107 disposes the overall models $M_W$ in a predetermined arrangement in the virtual space. Here, the floor model generating unit 107 disposes the overall models $M_W$ in the virtual space based on data indicating the arrangement of the rooms S on the floor so that the overall models $M_W$ are disposed in the same manner as the rooms S, thereby generating the 3D model of the entire floor.

According to the variation described above, it is possible to generate a 3D model depicting the entire floor with relatively simple processing.

The embodiment 1 explains the case in which a partial model $m_k$ is generated with the use of the orientation map of an image $I_k$, although various known techniques may be applicable to the method for generating the partial model $m_k$ from the image $I_k$. For example, the partial model generating unit 102 may generate the partial model $m_k$ using geometric context indicating a geometric feature of an object. The geometric context is known for the accuracy of the lower part of an image $I_k$ (near the floor). As such, the geometric context may be used for the lower part of the image $I_k$, and the orientation map may be used for the upper part of the image $I_k$. In this manner, the partial model $m_k$ may be generated by combining some model generating methods.

For example, the case has been explained in which the capturing ranges of the images $I_k$ overlap with one another, although the capturing ranges of the images $I_k$ do not necessarily overlap with one another. For example, in order to acquire the images $I_k$, the image acquiring unit 101 may split a photographed image I into a predetermined number of images such that the images do not overlap with one another. For example, the image acquiring unit 101 may acquire the images $I_k$ from the photographed image I such that there is a gap between the images $I_k$. Further, sizes and resolution of the images $I_k$ may be different from one another.

For example, the case has been explained in which the object models $M_{oj}$ oriented in various directions are stored in the object model database so as to estimate the initial value of the orientation parameter $\theta_j$, although the object models $M_{oj}$ in the initial condition may be disposed using a 3D model distributed by a server computer on the Internet. At that time, an object model $M_{oj}$ oriented in the similar direction to the direction of an object O in the photographed image I may be searched using conditional probability distribution, and such an orientation may be set as the initial value of the orientation parameter $\theta_j$.

For example, the case has been explained in which a position and an orientation of each partial model $m_k$ is determined based on a position of each image $I_k$ in the photographed image I, although each image $I_k$ may not be obtained by splitting a single photographed image I. In this case, a position and a direction of each partial model $m_k$ may be determined by other methods. For example, a capturing direction may be associated with each image $I_k$, and a position and an orientation of a partial model $m_k$ may be determined based on the capturing direction. In this case, the capturing direction may be determined based on acquiring order (capturing order) of the images $I_k$, or specified by a user.

[3-2. Variation Regarding Embodiment 2]

For example, an object O may be disposed not only on a horizontal surface, but also on a vertical surface. In the embodiment 2, the object model $M_{oj}$ representing a bed is disposed only on the floor, and the object model $M_{oj}$ representing a wall clock is disposed only on the wall. As such, a moving range of the position parameter $p_j$ may be restricted according to each object O.

The parameter determining unit 106 of this variation may determine a range in which the position parameter $p_j$ can be changed based on the objects O captured in the photographed image I. For example, the relationship between the objects O and the range of possible changes is stored in the data storage unit 100. The range of possible changes is a range the object model $M_{oj}$ can be moved, and a range to be a candidate of the position parameter $p_j$.

For example, in a case of an object O disposed on the horizontal surface, an area on the horizontal surface in the virtual space is the range of possible changes, and in a case of an object O disposed on the vertical surface, an area on the vertical surface in the virtual space is the range of possible changes. The parameter determining unit 106 determines the position parameter $p_j$ so that the position parameter $p_j$ of an object model $M_{oj}$ is set within the range of possible changes associated with an object O indicated by the object model $M_{oj}$.

According to the variation described above, the object model $M_{oj}$ can be moved within the range according to the characteristics of the object O. As such, it is possible to prevent the object model $M_{oj}$ from being disposed at a position that is unnatural in reality.

In the embodiment 2, an example of the first object is the objects O such as furniture, and an example of the second object is the wall W behind the furniture, although the positional relationship between the first object and the second object may be freely determined. The second object may be disposed in front of the first object, or disposed adjacent to the first object. That is, it is sufficient that the first object of a known size and the second object of a size to be estimated may be captured in the same photographed image I.

[3-3. Other Variations]

For example, the overall model $M_W$ may represent walls of an outdoor parking lot, and the object model $M_{oj}$ may represent a car and a motorcycle in the parking lot. The overall model $M_W$ and the object model $M_{oj}$ may be any type of object that can be detected in the photographed image I, and not be limited to the wall W or the object O.

For example, the 3D model generating system 1 may be configured of the 3D model generating device 10 only, or include other computer. For example, the 3D model generating system 1 may include the 3D model generating device 10 and a server computer. In this case, the object model database may be stored in the server computer.

The invention claimed is:

1. A 3D model generating system comprising at least one processor configured to:
    acquire a plurality of images respectively capturing different directions in a space surrounded by a plurality of surfaces;
    generate a plurality of partial models respectively corresponding to the images, each of the partial models representing a portion of the surfaces captured in the images;
    acquire image information about capturing directions of the respective images;
    determine positions and orientations of the respective partial models, which respectively correspond to the images, based on the image information acquired for the respective images; and
    generate an overall model representing an entire surface based on the partial models.

2. The 3D model generating system according to claim 1, wherein
    a capturing range of each of the images partially overlaps a capturing range of at least one of other images, and
    the at least one processor generates the partial models, a surface of each partial model partially overlapping a surface of at least one of other partial models, and positions the overlapped portions of the partial models to generate the overall model.

3. The 3D model generating system according to claim 1, wherein
the at least one processor acquires the images based on a single image in which the space is captured,
the image information indicates a position of each of the images in the single image, and
the at least one processor determines positions and orientations of the respective partial models, which respectively correspond to the images, based on the positions of the respective images in the single image.

4. The 3D model generating system according to claim 1, wherein the at least one processor acquires the images respectively capturing different directions from a point in the space.

5. The 3D model generating system according to claim 1, wherein the at least one processor:
acquires the images captured in a room,
generates the partial models each representing a portion of the room, and
generates the overall model representing the entire room.

6. The 3D model generating system according to claim 5, wherein the at least one processor:
acquires the images respectively captured in a plurality of rooms on a same floor,
generates the partial models respectively corresponding to the rooms,
generates overall models respectively corresponding to the rooms, and
generates an overall 3D model of the floor based on the overall models.

7. The 3D model generating system according to claim 5, wherein the at least one processor:
acquires the images of the rooms each having six or more side surfaces substantially orthogonal to one another,
generates the partial models each representing a portion of the six or more side surfaces, and
generates the overall model each representing the entire six or more side surfaces.

8. The 3D model generating system according to claim 1, further comprising a memory configured to store the images, wherein the at least one processor acquire the images from the memory.

9. The 3D model generating system according to claim 1, further comprising a camera configured to capture the space, wherein the at least one processor acquire the images captured by the camera.

10. The 3D model generating system according to claim 1, wherein one of the plurality of partial models is a 3D model representing a wall.

11. The 3D model generating system according to claim 10, wherein the partial model which is a 3D model representing a wall, is generated based on a shape and orientation of a flat portion captured in the images.

12. A 3D model generating method, comprising:
acquiring a plurality of images respectively capturing different directions in a space surrounded by a plurality of surfaces;
generating a plurality of partial models respectively corresponding to the images, each of the partial models representing a portion of the surfaces captured in the images;
acquiring image information about capturing directions of the respective images;
determining positions and orientations of the respective partial models, which respectively correspond to the images, based on the image information acquired for the respective images; and
generating an overall model representing an entire surface based on the partial models.

13. A non-transitory computer-readable information storage medium for storing a program for causing a computer to:
acquire a plurality of images respectively capturing different directions in a space surrounded by a plurality of surfaces;
generate a plurality of partial models respectively corresponding to the images, each of the partial models representing a portion of the surfaces captured in the images;
acquire image information about capturing directions of the respective images;
determine positions and orientations of the respective partial models, which respectively correspond to the images, based on the image information acquired for the respective images; and
generate an overall model representing an entire surface based on the partial models.

* * * * *